US012791451B2

(12) United States Patent
Pedrazzini et al.

(10) Patent No.: US 12,791,451 B2
(45) Date of Patent: Nov. 10, 2026

(54) AUTOMATED WORKSTATION, AND PROCESS, FOR HANDLING HISTOLOGICAL SAMPLES IN THE EMBEDDING STEP

(71) Applicant: Inpeco SA, Novazzano (CH)

(72) Inventors: Gianandrea Pedrazzini, Paradiso (CH); Alessandra Zucca, Selargius (IT)

(73) Assignee: Inpeco SA, Novazzano (CH)

( * ) Notice: Subject to any disclaimer, the term of this patent is extended or adjusted under 35 U.S.C. 154(b) by 515 days.

(21) Appl. No.: 18/563,477

(22) PCT Filed: May 24, 2022

(86) PCT No.: PCT/IB2022/054847

§ 371 (c)(1),
(2) Date: Nov. 22, 2023

(87) PCT Pub. No.: WO2022/249059

PCT Pub. Date: Dec. 1, 2022

(65) Prior Publication Data

US 2024/0272047 A1 Aug. 15, 2024

(30) Foreign Application Priority Data

May 26, 2021 (IT) ........................ 102021000013757

(51) Int. Cl.
*G01N 1/36* (2006.01)
*G01N 35/04* (2006.01)

(52) U.S. Cl.
CPC ............... *G01N 1/36* (2013.01); *G01N 35/04* (2013.01); *G01N 2001/366* (2013.01)

(58) Field of Classification Search
CPC ..... G01N 1/36; G01N 35/04; G01N 2001/366
(Continued)

(56) References Cited

U.S. PATENT DOCUMENTS 5,817,032 A * 10/1998 Williamson, IV ....... G01N 1/36 604/319
6,495,106 B1 * 12/2002 Kalra .................... G01N 1/312 422/510

(Continued)

OTHER PUBLICATIONS

Search Report and Written Opinion dated Sep. 9, 2022. 16 pages.

*Primary Examiner* — Arlen Soderquist
(74) *Attorney, Agent, or Firm* — RMCK Law Group PLC

(57) ABSTRACT

An automated workstation for an operator for embedding histological samples with embedding material includes a workbench for the operator defining a working area. On one side of the working area an input area is arranged which receives and accumulates automatically cassettes containing histological samples. A first handling device picks up cassettes from the input area and feeds them, one at a time, to the working area, according to a priority sequence determined in real time as a function of information associated with the histological samples of the cassettes, which are detected on codes indicated on the cassettes. For each new cassette that reaches the working area, the operator removes the histological sample from the cassette, dispenses a first layer of embedding material within a mould with a dispensing device, places the histological sample, with a selected orientation within the mould, and then applies the cassette over the mould.

15 Claims, 13 Drawing Sheets

(58) Field of Classification Search
USPC .......................................................... 422/536
See application file for complete search history.

(56) References Cited

U.S. PATENT DOCUMENTS

| | | | | | |
|---|---|---|---|---|---|
| 2002/0147515 | A1* | 10/2002 | Fava | G01N 35/0099 700/95 |
| 2005/0226770 | A1* | 10/2005 | Allen | G01N 35/00732 422/63 |
| 2008/0057573 | A1* | 3/2008 | Hutchins | G01N 1/36 435/307.1 |
| 2010/0151513 | A1* | 6/2010 | Vom | G01N 1/36 435/40.52 |
| 2010/0248301 | A1* | 9/2010 | Ulbrich | G01N 1/31 435/40.5 |
| 2010/0330660 | A1 | 12/2010 | Hutchins et al. | |
| 2011/0201106 | A1* | 8/2011 | Sohn | G01N 1/36 435/325 |
| 2015/0147819 | A1* | 5/2015 | Pedrazzini | G01N 35/0099 436/180 |
| 2015/0198509 | A1 | 7/2015 | Williamson et al. | |
| 2021/0109121 | A1* | 4/2021 | Dragt | G01N 35/0099 |

* cited by examiner

AUTOMATED WORKSTATION, AND PROCESS, FOR HANDLING HISTOLOGICAL SAMPLES IN THE EMBEDDING STEP

CROSS-REFERENCE TO RELATED APPLICATIONS

This application is a 371 National Stage of International Application No. PCT/IB2022/054847, filed May 24, 2022, which claims priority to Italian Patent Application No. 102021000013757 filed May 26, 2021. The disclosure of each of the above applications is incorporated herein by reference in its entirety.

FIELD OF THE INVENTION

The present invention concerns an automated workstation for an operator, and a process, for handling histological samples in the embedding step.

In the field of anatomical pathology, the embedding step of a histological tissue in an embedding material (typically paraffin) is performed after a surgical sample taken from a patient has undergone cutting ("grossing"), formalin fixation and a treatment ("processing") in which the tissue sample is dehydrated in alcohol and then clarified with xylene, so as to transform the tissue itself from hydrophilic to hydrophobic, in order to proceed with a first impregnation in paraffin.

PRIOR ART

Figure 1:
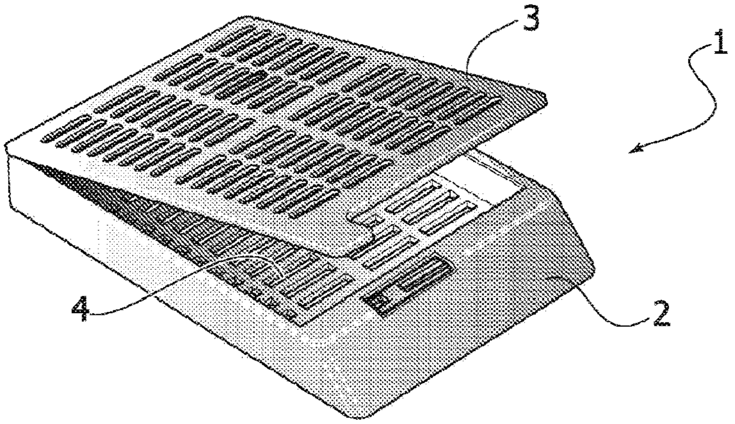

According to the conventional technique, in the aforementioned grossing step the biological tissue is inserted into a histology cassette, within which it is while it undergoes the aforementioned processing operation, to be then directed towards the subsequent embedding step. An example of a conventional histology cassette is illustrated in FIG. 1 of the annexed drawings.

With reference to this figure, the number 1 indicates the assembly of a cassette 2 and a lid 3. In a typical example, the body of the cassette 2, made of plastic material, is in the form of a relatively flat container, with a flat bottom wall 4 and two pairs of opposite walls defining a containment cavity for the histological sample, which can be closed with the lid 3. The bottom wall 4 of the cassette 2 is shaped like a grid, for reasons that will become clear in the following.

According to the conventional process, which is performed entirely manually, before carrying out the embedding procedure an operator separates the lid 3 from the cassette 2, takes the histological sample from the cassette 2 with the aid of a clamp and places it on the bottom of a mould intended to receive the embedding material, and already arranged with a first layer of embedding material (typically paraffin at a temperature sufficient to keep it in a fluid state). The mould can be constituted, for example, of plastic or metallic material and can have a bottom of dimensions which vary according to the sample to be received.

Figure 2:
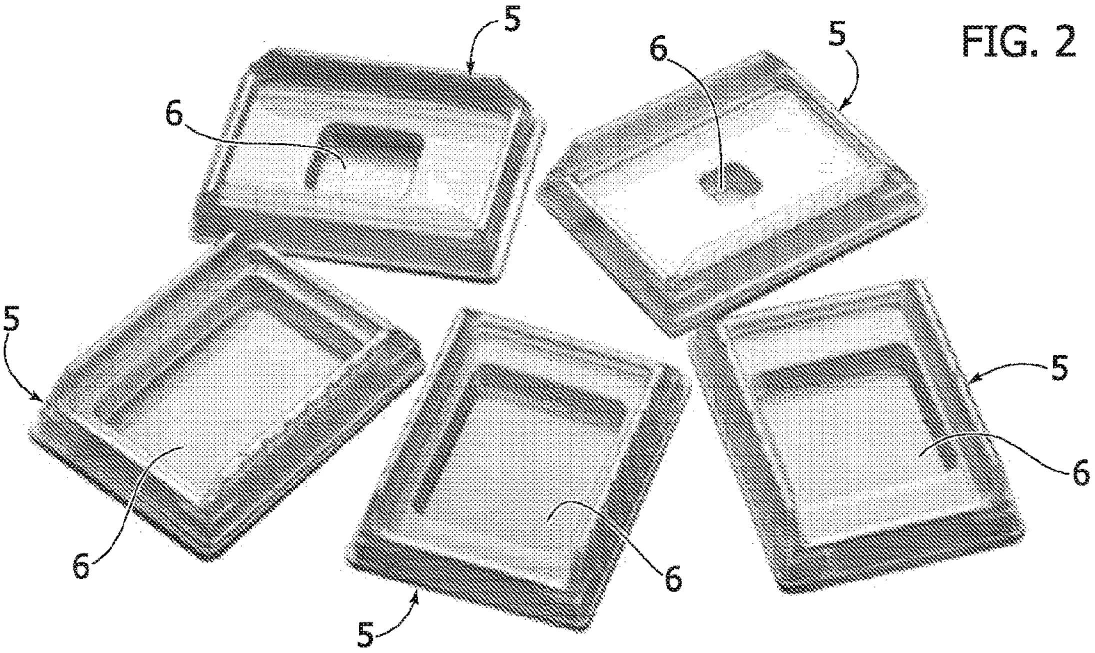

FIG. 2 of the annexed drawings illustrates some examples of moulds 5 of a conventional type. The moulds 5 are configured and sized to receive the body of a cassette 2 above them. Indeed, after the histological sample has been positioned on the bottom of a mould 5, the cassette 2 (separated from the lid 3) is applied on top of the mould 5. Still with reference to FIG. 2, it can be seen that, although the external dimensions of each mould 5 are chosen in such a way as to allow the application of the body of the cassette over the mould, each mould 5 has a bottom cavity 6, intended to receive the histological sample, which varies in size from mould to mould, depending on the histological sample to be received.

As indicated above, in the conventional procedure, the operator pours a first layer of embedding material on the bottom 6 of a mould 5 and then inserts the histological sample taken from a cassette on the bottom 6 of the mould 5. This step is extremely critical to ensure a high reliability of the examination that is subsequently performed on the sample. In fact, the operator must pay attention to place the histological sample on the bottom of the mould with the most appropriate orientation in order to guarantee the best results in the next microtomy step, in which the sample embedded in a block of embedding material is subjected to the cut.

Once the operator has placed the histological sample on the bottom of the mould 5, orienting it in the most appropriate way, he applies the cassette 2 above the mould 5.

Once this operation has been performed, the operator places the mould 5 containing the histological sample, with the cassette 2 applied above it, under a dispensing tap of embedding material (typically paraffin) maintained at a temperature sufficient to leave it in a fluid state. In this step, the embedding material is poured by gravity into the mould 5, making it pass through the openings of the bottom wall 4 of the cassette. Fluid is poured in sufficient quantity to fill the mould and the containment space of the cassette above the mould.

Once the mould 5 has been filled with embedding material, it is left to cool, by placing it on a cold plate at a temperature usually between −5° C. and −10° C., until the embedding material solidifies. At that point, the solidified body 7 of the embedding material, with the histological sample S embedded therein (FIG. 3) is separated from the mould 5. The body of the cassette 2 remains joined to the solidified body 7.

The conventional process described above guarantees a good reliability of the histological examination, as it entrusts the orientation step of the histological sample inside the mould to an operator. This step, as already indicated, is critical for obtaining a good final result and requires the skill of an expert operator who chooses the best orientation of the sample based on the specific features, the shape and the size of the sample and also considering the type of analysis for which it is intended.

At the same time, the traditional, totally manual process involves an intrinsic limit to the productivity of the laboratory.

Another drawback of the fully manual conventional process is that it is subject to a risk of errors which, although small, is not null. Cassette 2 containing each histological sample normally carries an information carrier related to the sample contained therein. This allows the system to preserve a minimum level of traceability of the sample, in the sense of associating the sample with a series of information relating to it, including the identification of the patient, the type of surgical sampling to which it was subjected and the type of test to which it is intended. In a traditional anatomical pathology laboratory, each operator receives on a bench a plurality of cassettes each containing a histological sample and, for each cassette, carries out the above described cycle of operations to embed a histological sample in the embedding material. This way of operating naturally involves the risk of exchanging the samples with each other and of associating a wrong sample to a wrong cassette.

Another drawback of the traditional process lies in the fact that the operator is not physically able to precisely control the quantity of embedding material that is poured into the mould. This may involve the need, after the solidification of the body of embedding material containing the histological sample inside it, to perform a trimming of said body to the predetermined dimensions suitable for its introduction into the microtome, in case the amount of embedding material poured is overflowing. Similarly, an insufficient filling of embedding material within the mould would require a subsequent pouring of the material itself. These operations involve a high waste of time and result in a consequent loss of productivity.

Documents US 2015/198509 A1 and JP 6 383 625 B2 describe a system and a process for automatically carrying out the embedding operation of a histological sample in an embedding material. According to this proposal, the histological sample is arranged inside a support, of the dedicated type, which is in turn arranged within a cassette, also of the dedicated type. The support locks the histological tissue in place, exerting a specific compression action on the tissue itself, in order to maintain a sample orientation that is set during the previous grossing step. Still according to this known proposal, at least three different types of supports for the sample are provided, which can be chosen according to the size of the sample. The support, with the sample inserted therein, is positioned inside a cassette, which in the case of this known solution makes the functions of the mould of the conventional process. The cassettes, with inside them the supports containing the samples, are then placed inside an apparatus which automatically performs the embedding operation.

The aforementioned prior art is not free from drawbacks. First of all, the preparation of the histological sample within a support which is then positioned inside the cassette can involve the application of an excessive pressure on the sample, so that during the subsequent cutting operation, in microtomy, it can occur that the material constituting the support sticks to the sample or leaves a footprint on the sample, contaminating it, or in any case making necessary subsequent operations of cleaning and separation between the actual organic tissue and the material that adhered to the tissue, with consequent loss of time for the operator. In other cases, it may occur that the compression of the tissue within the support is not sufficient to prevent the sample from moving inside the support, losing the orientation it was given and also with the risk of falling out of the cassette, in particular during the processing step in which the cassettes containing the samples undergo various passages through the different reagents of the process. But the main drawback of the aforementioned known system is that the process carried out within the embedding workstation is completely "closed", in the sense that it does not allow any type of check in progress on the operations that are performed within the workstation. This can result in an error (for example, an incorrect association of a sample with the identification information of the sample) being detected too late, i.e. when a sample embedded in an embedding material has already arrived to the microtomy station in order to be cut. The same drawback exists when, for example, it occurs that the sample in a cassette has been lost, or that it is badly oriented and therefore unsuitable for cutting, or even when it is found that the same support embeds two non-homogeneous samples. In the case of a badly oriented sample, the diagnosis can certainly be compromised. If, on the other hand, a sample is lost, an investigation must be started to recover it with the consequent need to block the system, with significant drawbacks from the point of view of productivity.

OBJECT OF THE INVENTION

The main object of the present invention is to solve the drawbacks of the known solutions.

In particular, an object of the present invention is to provide an automated workstation and a process for the embedding of a histological sample in an embedding material which on the one hand keeps a high degree of reliability as regards the orientation of the histological sample during the embedding operation and the preservation of this orientation during the entire operation, but which on the other hand allows to significantly increase productivity compared to the conventional totally manual process, also standardizing its execution.

Another important object of the present invention is to provide an automated workstation and a process for embedding a histological sample in an embedding material which achieves a very high degree of safety against the risk of errors both as it concerns the correct association of a histological sample with information relating to its identification, and as it concerns the control of the presence and correct positioning of the histological sample during the whole embedding process.

Another object of the present invention is to provide an automated workstation and a process for embedding a histological sample in an embedding material which are completely "open" in the sense of allowing a verification check and, if necessary, a correction intervention during the entire execution of the embedding process.

A further object of the invention is to provide an automated workstation and a process for embedding a histological sample in an embedding material which allow an extremely precise control of the amount of embedding material that is dispensed within the mould and the associated cassette also according to the volume, different from case to case, filled by the histological sample to be embedded, with the consequent possibility of avoiding waste of time due to subsequent trimming operations of the solidified body of the embedding material.

A further object of the invention is to provide an automated workstation and a process for the embedding of an organic sample in an embedding material which have a high degree of flexibility, in the sense of being able to operate with cassettes and moulds of any known type used in the conventional manual process, without requiring the preparation of dedicated cassettes or moulds.

A still further object of the invention is that of realizing all the aforementioned goals with relatively simple means and with small dimensions and low cost.

SUMMARY OF THE INVENTION

In order to achieve one or more of the aforementioned objects, the invention relates to an automated workstation for an operator, for embedding histological samples with embedding material, comprising:

- a workbench for an operator, defining a working area of the operator,
- an input area for histological samples intended to undergo an embedding operation, placed on one side of the working area of the operator and configured to receive and accumulate in an automated way, from a transport system, cassettes containing histological samples, wherein each cassette comprises a body bearing an information carrier with information associated with the histological sample which is contained within the cassette, a first detection device arranged within said input area and configured to detect the information of the information carrier of each of each one of the cassettes located within the input area, a first handling device next to said input area and to said working area of the operator, and configured and programmed to pick up the cassettes containing the histological samples from said input area and to feed them, one at a time, to said working area, an electronic controller of said workstation, configured and programmed to:

receive from said detection device, and store, the information associated with the histological sample of each of the cassettes located within the input area, controlling said first handling device, so as to feed, one at a time, the cassettes containing the histological samples from said input area to said working area, according to a priority sequence determined in real time as a function of the aforementioned information associated with the histological samples of the cassettes, said electronic controller enabling the feeding of each new cassette from said input area to said working area of the operator only after receiving a signal which indicates that the working area of the operator is free to receive a new cassette, wherein said working area of the operator is provided with a plurality of embedding moulds, so that the operator can select each time a suitable mould, according to the size of the histological sample contained in each new cassette that reaches the working area of the operator, wherein a first embedding material dispensing device, which can be used to dispense a first layer of embedding material within the selected mould, is associated with said working area, in such a way that, for each new cassette reaching the working area, the operator can remove the histological sample from the cassette, detect the volume of the histological sample, consequently select a mould, obtain the dispensing of a first layer of embedding material within the selected mould by means of said first dispensing device, placing the histological sample, with a selected orientation, within the mould and over the first layer of embedding material, and then apply the cassette over the mould containing the histological sample thus oriented, said workstation further comprising:

a transfer device arranged on one side of the working area, on the opposite side with respect to said input area, to transfer the cassettes out of the working area, said transfer device being configured to receive, one at a time, from the operator, the moulds containing the oriented histological samples, each mould with the respective cassette applied thereon, a second detection device associated with said transfer device and arranged and configured to detect the information carried by the information carrier of each cassette transported by said transfer device, and to send to said electronic controller a signal which indicates the passage of each new cassette on the transfer device, such signal being used as a signal which indicates that the working area of the operator is free to receive a new cassette from the input area, a second embedding material dispensing device associated with said transfer device, and configured to fill, in a controlled manner, each mould carried by said transfer device, and the associated cassette placed thereon, with a volume of embedding material, said second dispensing device being servo-controlled by said electronic controller on the basis of the signal of a sensor able to detect the level of the embedding material within the mould and the associated cassette, in such a way that the dispensing of said embedding material is interrupted when a predetermined level of embedding material within the mould and associated cassette has been reached, and a cooling area arranged downstream of said transfer device, configured to receive and accumulate in an automated way the moulds coming from said transfer device, each one with the respective histological sample covered by the embedding material and the respective cassette applied on the mould, in such a way that in said cooling area the embedding material containing each histological sample forms a solidified body, in which the histological sample is embedded.

According to a further feature of the invention, the workstation further comprises a second handling device, to pick up from the transfer device each mould and the associated cassette, which are filled with embedding material, and to deposit them at said cooling area and, preferably, also a third handling device, which can be constituted by the second handling device or by a further handling device, configured and programmed to pick up a cassette and the solidified body of embedding material adhering thereto, together with the associated mould, after they have been cooled at said cooling area, and to feed them at first to a station for detachment of each mould from the solidified body adhering to the cassette and thereafter to an output area of the workstation which is configured for delivering the cassettes, with the associated solidified bodies in which the histological samples are embedded, to a transport system.

According to a further preferred feature, said working area is equipped with a monitor for displaying the information contained in the information carrier of the cassette located at the working area to the operator.

In a further embodiment, the working area is provided with a mould feeding system, for feeding moulds to the working area and, preferably, said mould feeding system is controlled by said electronic controller in such a way as to select, on the basis of the information contained in the information carrier of the cassette located at the working area and after detection of the size of the histological sample which is within the cassette, a mould of a type suitable for the histological sample to be processed and to feed this mould to the working area.

Still in a further embodiment, the workstation comprises an automatic transport system for retrieval of the moulds after their detachment from the respective solidified body of embedding material and from the associated cassette, and for feeding the retrieved moulds, through a cleaning station, back to the working area.

The present invention also relates to the process which is carried out by means of the automated workstation described above.

Advantages of the Invention

Thanks to the above indicated features, the workstation according to the invention allows to obtain a series of relevant advantages.

First of all, productivity is drastically increased compared to the case of the conventional process, since the entire cycle of operations that precedes and follows the step of placing and orientating the sample within the mould is carried out in a totally automated way.

At the same time, an operator can manually perform the step of placing and orienting the histological sample within the mould, which ensures greater reliability on the correct orientation of the sample and on the maintenance of such correct orientation during the process, which, as it has been seen, constitutes a critical factor for obtaining an optimal result in the following analysis of the sample.

Furthermore, the workstation according to the invention allows a drastic reduction, if not a total elimination, of the risk of errors, due to the fact that it is arranged to feed the working area of the operator one cassette at a time, in an automated way, when a signal indicating the conclusion of the cycle of operations carried out in the working area on a previous cassette has been detected.

A further important advantage of the workstation according to the invention lies in the fact that it is totally “open” in the sense that it allows traceability of each histological sample during the entire cycle of operations to which it is subjected, with the possibility of checking at all times the association of a specific sample with the information that identify it, and of checking the correct performance of operations and intervene during the work to correct any detected abnormality.

A further relevant advantage of the invention lies in the fact that it allows a precise control of the quantity of embedding material that is poured into each mould, linked to the volume occupied by the histological sample, which gives the possibility of obtaining, with the solidification of the embedding material, a body without excess portions which therefore does not require any shaping or trimming.

A further advantage of the workstation according to the invention is that of being able to adapt to the use with any cassette or mould of a known type, as well as to the interfacing with any known device able to perform the previous processing step.

DETAILED DESCRIPTION OF PREFERRED EMBODIMENTS

Figure 3:
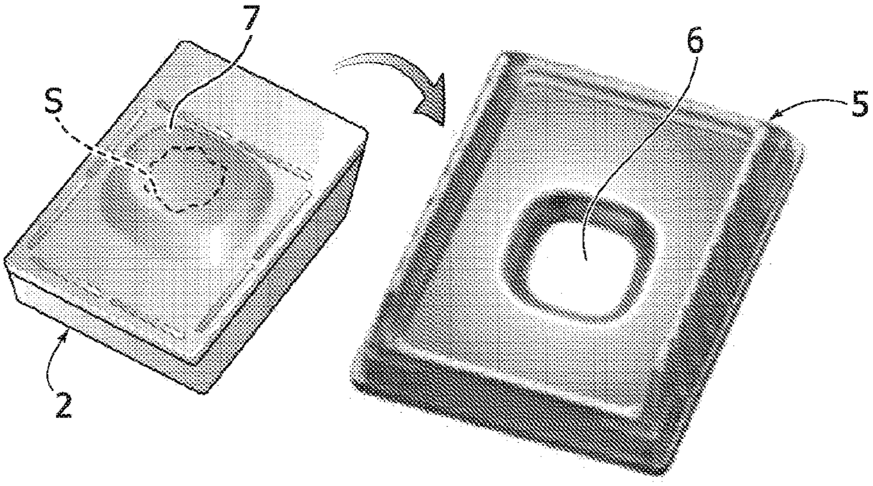
Figure 4:
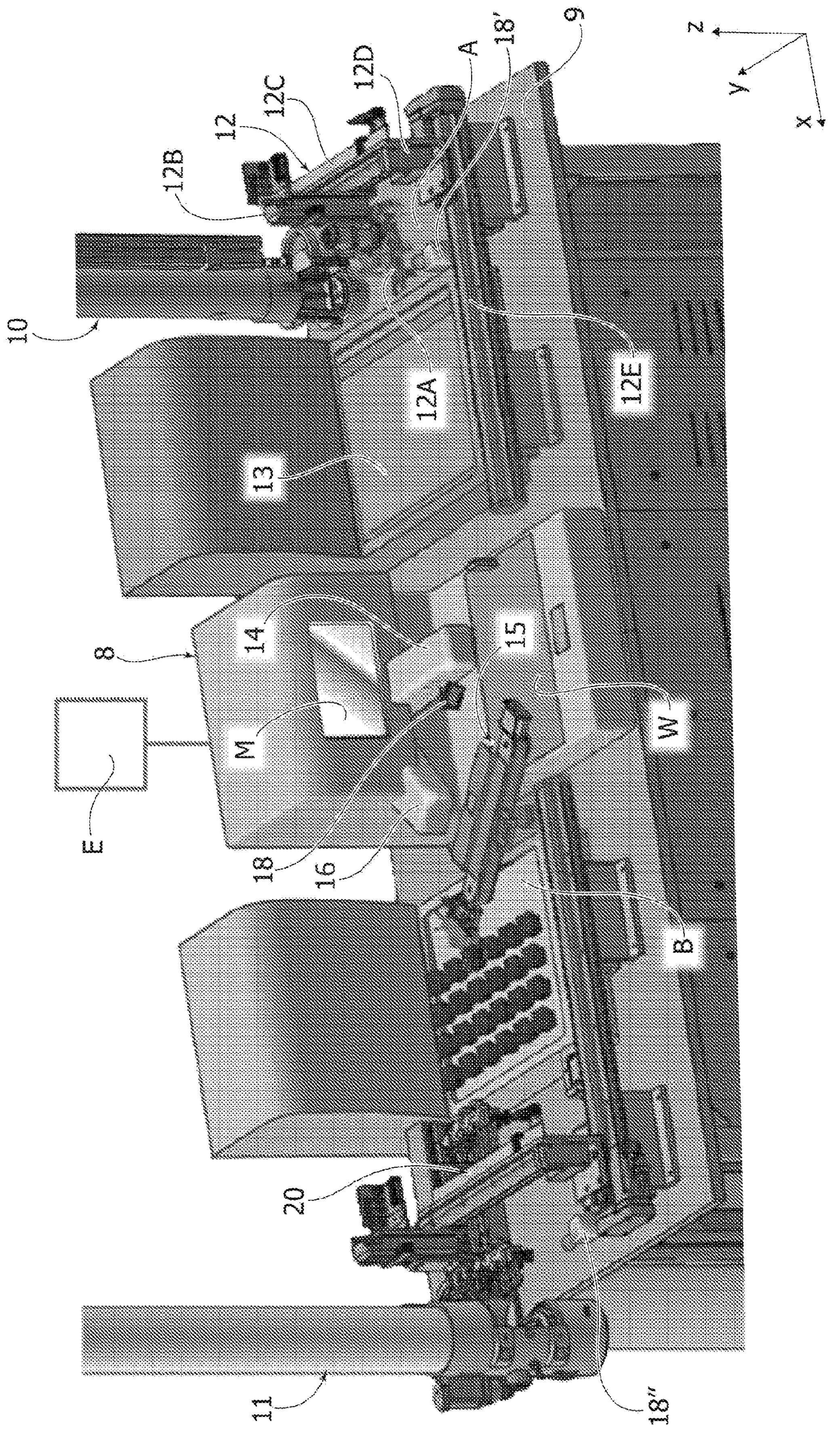
Figure 5:
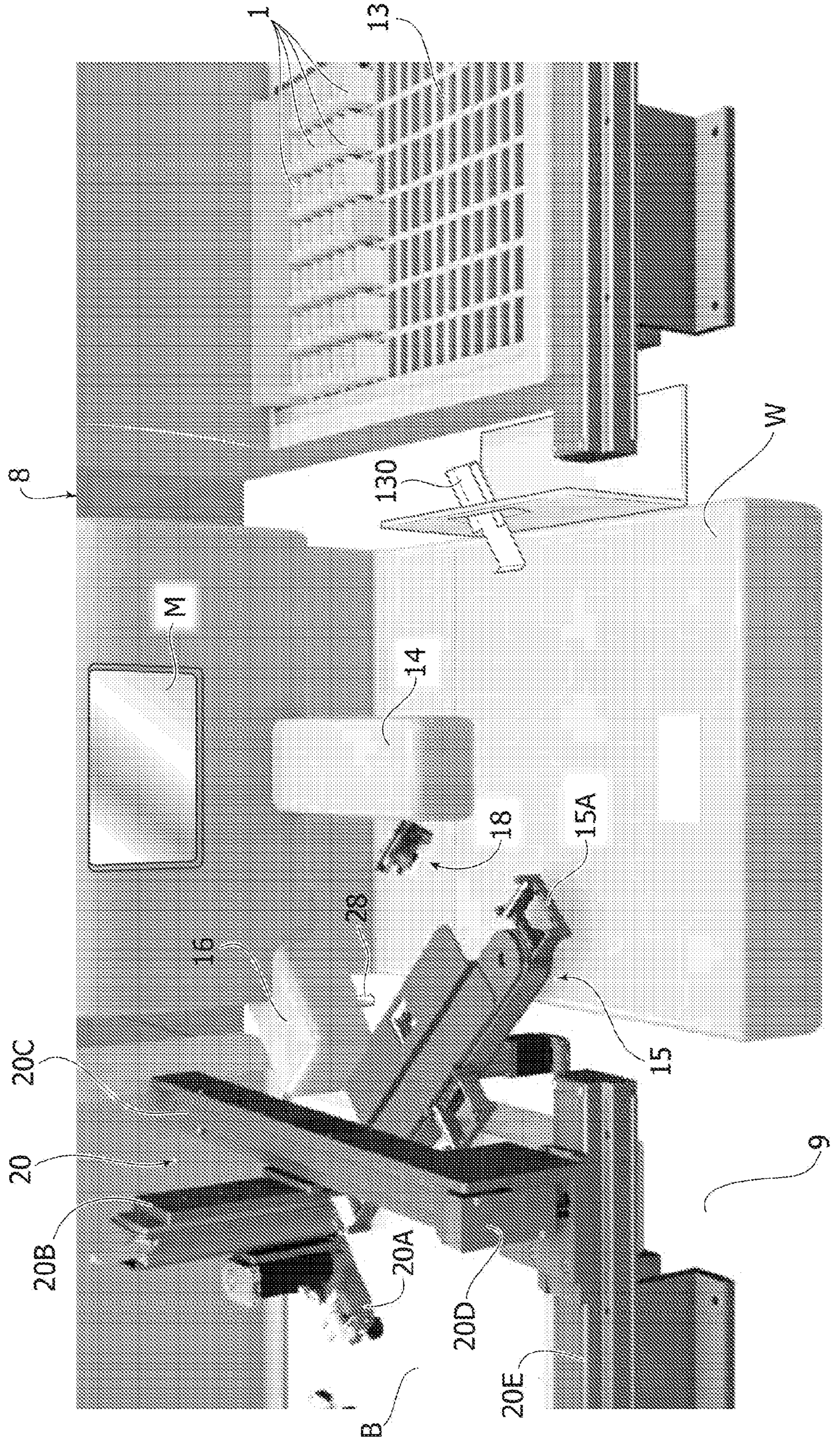
Figure 6:
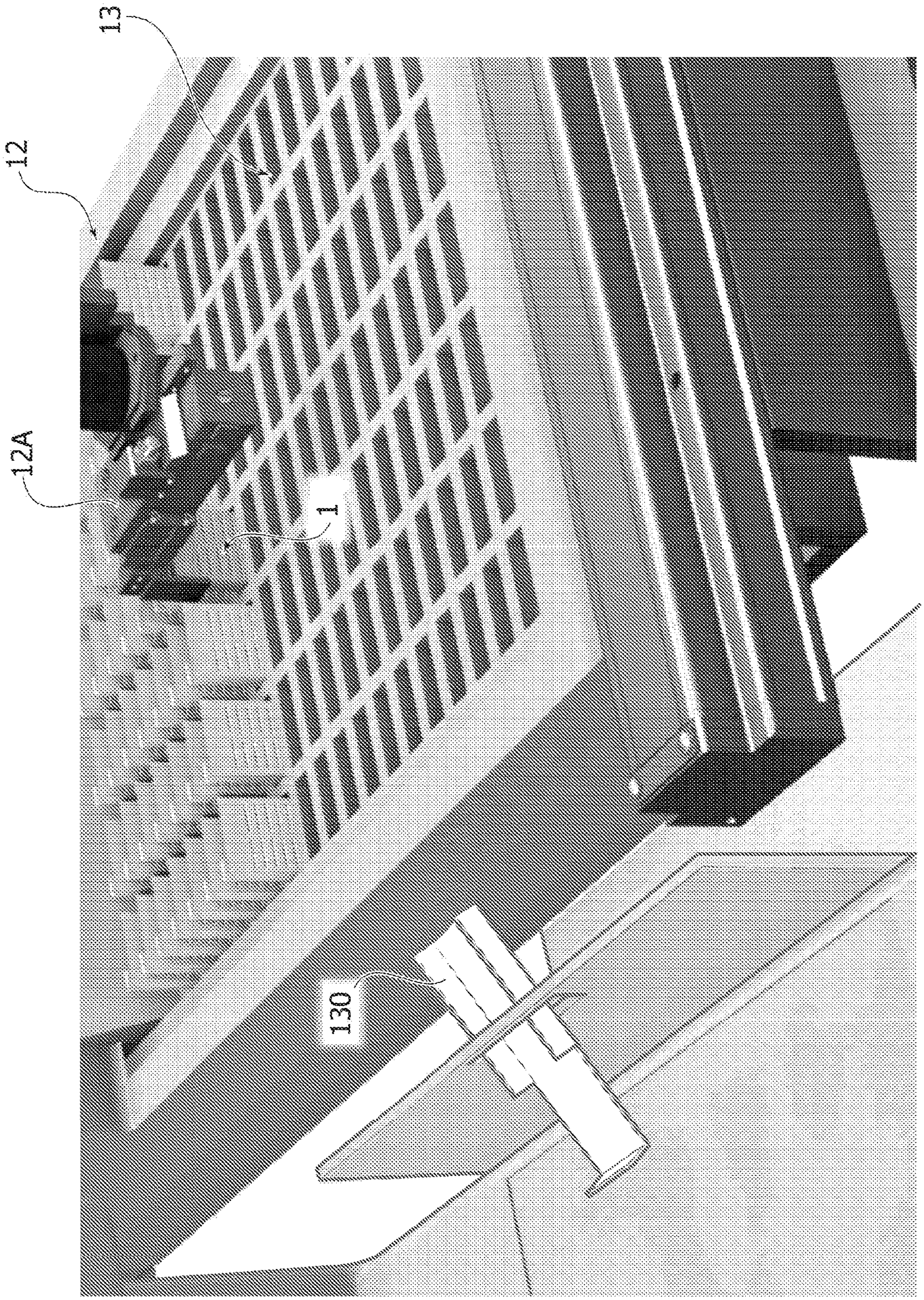

Further characteristics and advantages of the invention will be clear from the following description with reference to the attached drawings, provided purely by way of non-limiting example, in which:

FIG. 1 is a perspective view of a known type of histology cassette, which can also be used in the workstation according to the invention, FIG. 2 shows a series of known moulds that can also be used in the workstation according to the invention, FIG. 3 illustrates a step of the process according to the prior art, wherein the solidified body of an embedding material containing inside it an organic component and with a cassette body associated with it, is separated from a mould in which it has been obtained, FIG. 4 is a perspective view of an embodiment of the workstation according to the invention, FIG. 5 is a further perspective view of the main components of an embodiment of the workstation according to the invention, FIG. 6 illustrates in an enlarged perspective view a detail of the workstation of FIG. 5, in a step of the process according to the invention, and FIGS. 7, 8, 8A and 9-21 are perspective views that illustrate further steps of the process according to the invention carried out with the workstation of FIG. 5.

FIGS. 1-3 have already been described with reference to the conventional process in which all the operations necessary for the embedding of a histological sample S in an embedding material are performed manually.

FIG. 4 illustrates a perspective view of a first embodiment of a workstation according to the invention. The reference number 8 indicates as a whole the workstation, which comprises a bench 9 on which an input area A is defined, configured to receive from a transport system 10 cassettes 2 containing histological samples.

In a particularly preferred embodiment, automated transport systems are provided upstream and downstream of the workstation 8 according to the invention. The transport system 10 which is arranged upstream feeds cassettes containing histological samples to be analyzed, while a transport system 11 arranged downstream of the workstation feeds histological samples, each embedded in a body of embedding material, to the next station of an automated sample processing line. FIG. 4 of the annexed drawings shows an example in which automated transport systems 10, 11 are provided, upstream and downstream of the workstation 8, in the form of pneumatic mail systems. Preferably, these systems are made according to what is described in the Applicant’s Italian patent application No. 102021000009788. The construction details of the transport systems 10, 11 are not described here, both as they can be made in any known way, and as they, taken alone, do not fall within the scope of the present invention. It should be noted that the upstream and downstream transport systems, in a less preferable and not illustrated embodiment, can also be manual.

Returning to FIG. 4, the transport system upstream of the workstation 8 feeds cassettes 2 of the type illustrated in FIG. 1 with one or more histological samples freely arranged within the cassette, each cassette 2 being closed with a respective lid 3.

An advantageous feature of the workstation according to the invention is that it is able to operate, in a totally flexible way, with any known type of cassette.

Furthermore, as will be evident from the following description, in the process and in the workstation according to the invention, the advantage of continuous traceability of each processed sample is achieved, which allows the sample to be associated with the identification information relating thereto throughout all the course of operations performed at the workstation.

For this purpose, an information carrier is provided on the body of the cassette 2 which carries information associated with the histological sample contained in the cassette. In a preferred example (see FIG. 12) the body of the cassette 2 has a surface 2A which is well exposed to the view, carrying an information carrier C, which can be a code of any known type (for example a bar code) but which in the example is a QR code.

The information contained in the code C may include patient identification information, information related for example to the number of samples inserted within the same cassette, information related to the previous processing steps which the sample underwent, information related to the nature of the sample, macroscopic images of the sample and any further information that may be useful to an operator who manually performs, in a working area W downstream of the input area A (FIG. 4), the operation of depositing each histological sample in a mould and orienting the sample within the mould.

An electronic controller E (only schematically indicated in FIG. 4) is associated to the workstation 8. The electronic controller E is configured and programmed to control all the automated devices of the workstation 8 and to assist the operator working in the working area W.

The cassettes 2, suitably closed with the respective lid 3, which are received in the input area A are picked up by a handling device 12 of any known type and deposited in an accumulation area 13 which, if necessary, can be provided with a system to keep the cassettes in a desired temperature range.

In the illustrated example, the handling device 12 consists of a robot of any known type having a gripping head 12A movable along three axes X, Y, Z orthogonal to each other. In the example shown in FIG. 1, the head 12A is movable along the vertical axis Z on a slide 12B sliding on its turn along a horizontal axis Y on guides of a horizontal beam 12C. The horizontal beam 12C in turn protrudes from a slide 12D slidingly mounted along a horizontal axis X on guides carried by a longitudinal bar 12E, fixed to the bench 9.

In a preferred example an optical detection device 18 of any known type, able to detect the code C carried by each cassette 2 so as to allow the electronic controller E to trace the cassette during its entire path through the workstation, can be associated to the input area A or to the handling device 12. In the example of FIG. 4, the optical detection device 18' is arranged in a stationary position in the input area A. The handling device 12 can be programmed to pick up a cassette 2 fed by the transport system 10 and to present it in front of the optical detection device 18', in order to allow the reading of the code C, then the handling device 12 itself can temporarily position the cassette in the accumulation area 13.

The workstation is preferably equipped with a monitor M on which the electronic controller E displays the information related to the cassette which is from time to time in the working area W.

A fundamental feature of the present invention lies in the fact that the working area W where the operator works receives only one cassette at a time. As will be seen in more detail below, only when the cycle of operations that must be performed in the working area W on a specific cassette is over, the system enables the feed to the working area W of a new cassette. When the signal indicating the completion of the cycle of operations performed on the cassette located in the working area W is received by the electronic controller E, this last controls the handling device 12 to pick up a specific cassette from the accumulation area 13 and feed it to the working area W.

As will also be described in more detail below, the electronic controller E is configured and programmed to perform a selection ("sorting") of the cassette that must be fed from time to time to the working area W on the basis of the information associated with each cassette, which are detected by means of the optical detection device 18' located at the input area A.

Preferably, after the feeding of the cassette to the working area W, the dimensions and hence the volume occupied by the histological sample contained in the cassette 2 are detected, according to any known measuring or scanning device. Still with reference to FIG. 4, in the working area W an operator then manually performs the operations necessary to arrange a histological sample within a respective mould, with an appropriate orientation. Each time a cassette 2 reaches the working area W, the operator removes the lid 3, picks up the histological sample and places it, with an appropriate orientation, on the bottom 6 of a respective mould 5 (see FIGS. 2, 3) after having previously poured on the bottom of the mould a first layer of embedding material (typically paraffin) by means of a dispensing device 14.

In particular, the aforementioned mould 5 can be manually chosen by the operator with an appropriate size based on the volume of the histological sample previously detected. On the other hand, according to a preferred solution, the mould 5 can be supplied to the operator automatically, again on the basis of the detected volume of the histological sample, as well as already pre-filled with paraffin in an automated way by the dispensing device 14 according to the size of the bottom 6 of the mould 5 itself.

Once the operation of repositioning the histological sample in the mould has been performed, the operator applies the cassette 2 over the mould 5 and places the group thus obtained on a transfer device 15, which will be described in more detail below as well as all the following steps, with reference to FIGS. 5-21.

The transfer device 15 carries the mould 5 containing the histological sample, with the body of the cassette 2 applied above it, to an embedding material dispensing device 16. In the station 16, the mould and the cassette associated with it are filled with embedding material (typically paraffin) maintained in a fluid state. As will also be described in detail below, the dispensing of embedding material is carried out in a controlled and precise way, since a sensor device is associated with the dispensing device 16 to detect the level of the embedding material within the cassette, assisted by an algorithm able to calibrate the dispensing on the basis of a series of parameters known to the electronic controller E from the previous step. Before or after the dispensing device 16 a detection station 18 is provided, able to detect the information associated with the code C carried by the cassette 2.

Again with reference to FIG. 4, downstream of the transfer device 15 there is a cooling area B where a handling device 20 provides to deposit the moulds coming from the transfer device 15. All the aforementioned construction details will be described below with reference to FIGS. 5-21.

Finally, the workstation 8 comprises a system for picking up the moulds from the cooling area B, after the time necessary to obtain the solidification of the embedding material carried by each mould has elapsed. As will also be described in detail below, the workstation comprises a device for detachment of the cooled moulds 5 from the respective cassettes 2, with the solidified embedding material which remains associated with each cassette 2. A transport device provides to feed at the output of the workstation or in an accumulation area the cassettes 2 with associated the bodies of embedding material within which the histological samples are embedded.

FIG. 5 shows a further embodiment of the workstation according to the invention. With reference to this example, the accumulation area 13 at the input of the machine comprises a rack in which the handling device 12 positions the cassettes 2 reaching the input area A of the workstation, still closed by the lid 3 (it is always to be considered that the union between the cassette 2 and the respective lid 3 is indicated in the figures with the number 1).

When the electronic controller E receives a signal indicating the completion of the cycle of operations on the cassette which was in the working area W, it enables the feeding to the working area W of a new cassette. In this condition, the handling device 12 brings its gripping head 12A to a predetermined position, to pick up a given cassette 2.

As already indicated above, the electronic controller is configured and programmed to carry out a selection operation ("sorting") of the cassettes 2 so as to feed the cassettes one at a time from the accumulation area 13 to the working area W according to a predetermined sequence, on the basis of the information associated with each cassette (which in this example are detected by means of the optical detection device 18' described above). Therefore, in the aforementioned example, this sorting operation is performed before the intervention of the operator in the working area W.

The criteria followed by the electronic controller to define the most appropriate sequence can be of various types and can be based, for example, both on the information associated with the cassettes and on the need to homogeneously distribute the work to the microtomy stations arranged downstream of the workstation. Basically it is therefore possible to organize and distribute the histological samples to the subsequent processing stations both on the basis of the nature of the analyses to be performed and on the basis of the organizational needs of the laboratory.

Figure 7:
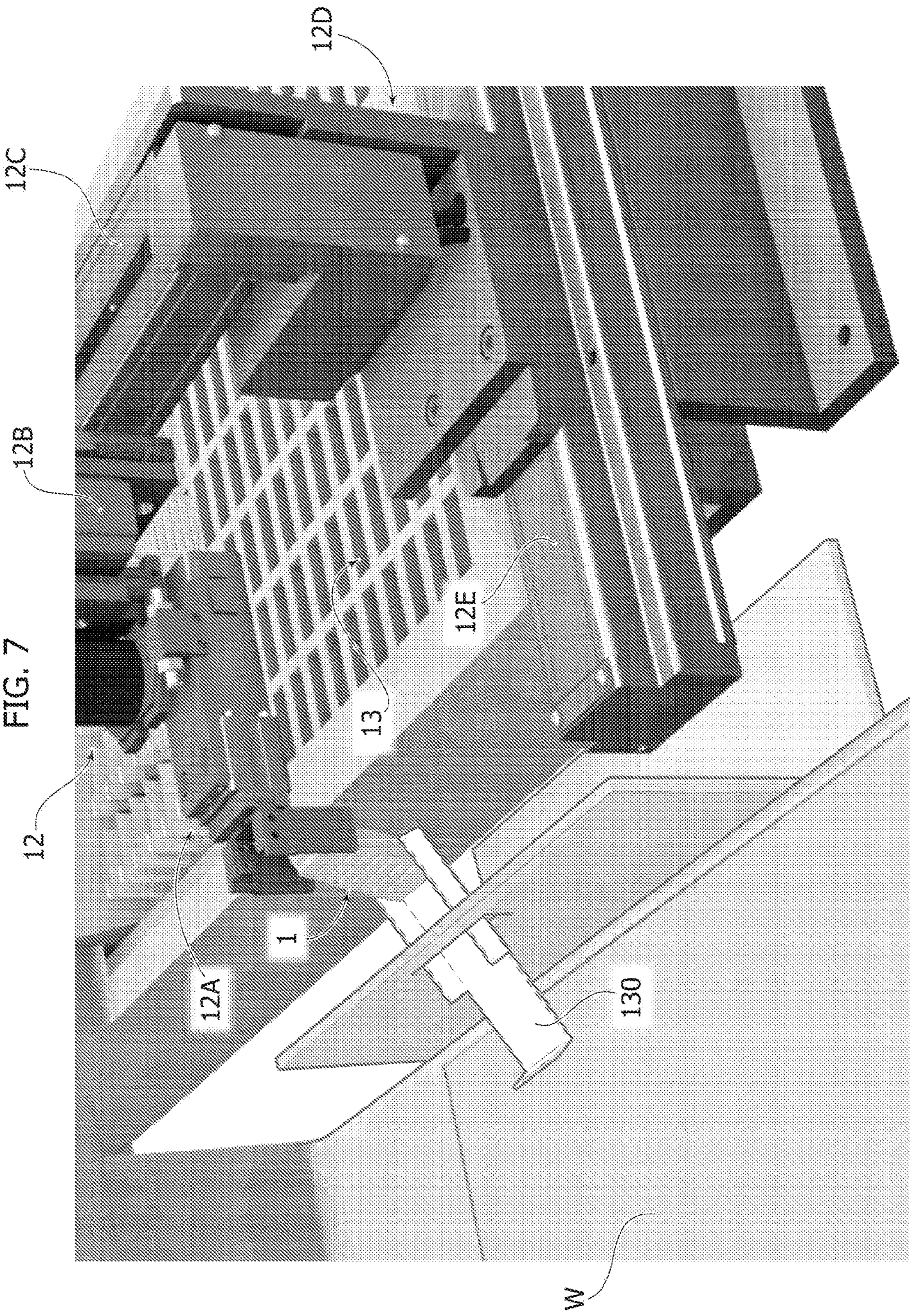

FIG. 6 of the annexed drawings shows the step in which the gripping head 12A of the handling device 12 picks up a cassette 2, while FIG. 7 illustrates the following transfer step of the cassette 2 at the inlet of a chute 130 for feeding the cassette 2 to the working area W.

Figure 8:
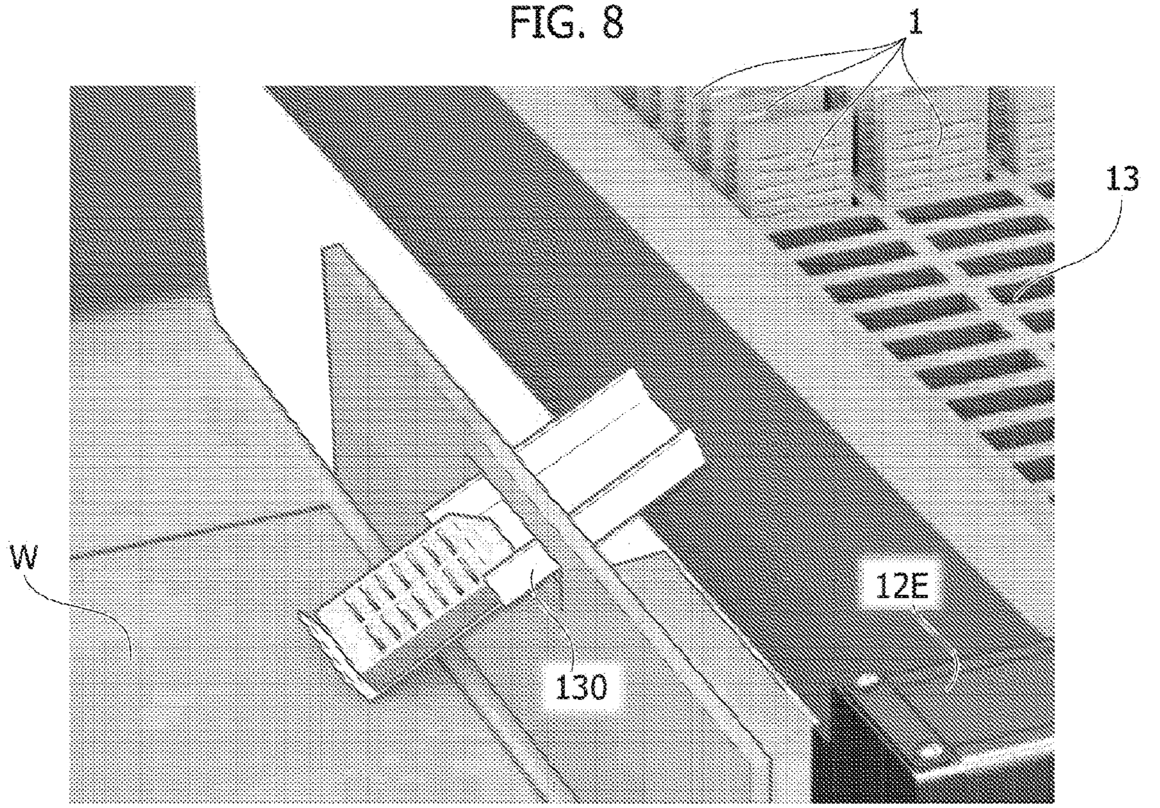

FIG. 8 shows cassette 2 at the arrival position in the working area W.

Figure 8A:
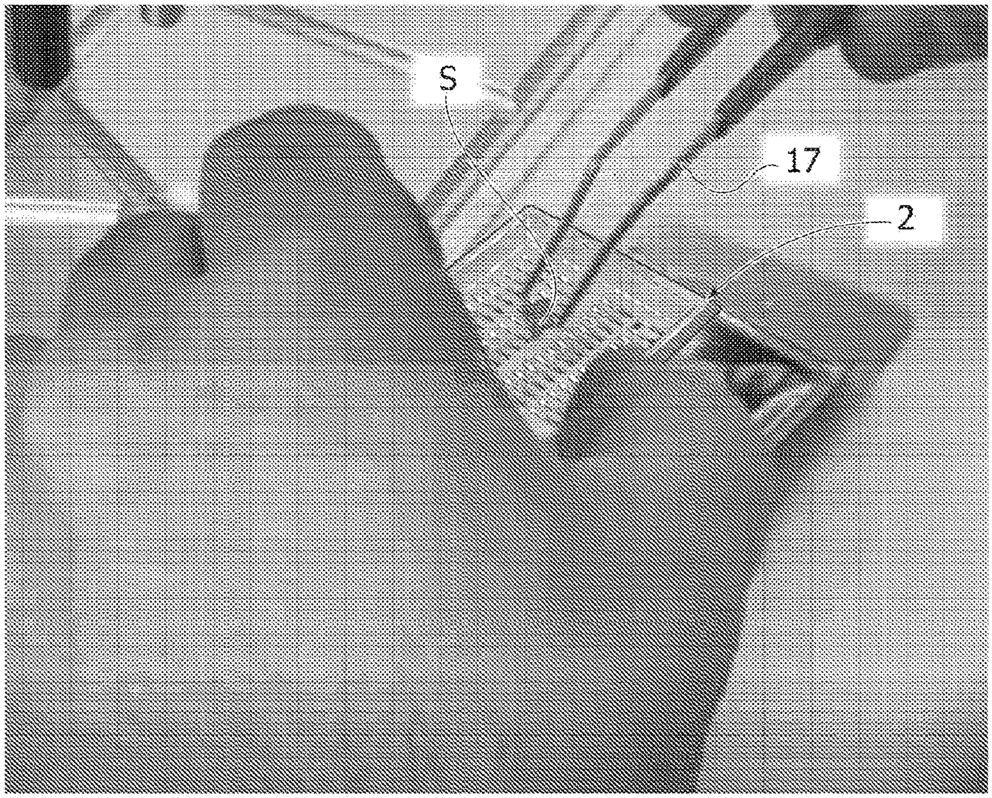

FIG. 8A shows the beginning of the manual operations performed by the operator in the working area W. The operator separates the cassette 2 from the lid 3 and picks up a histological sample S contained in the cassette 2 with the help of a tweezer 17. Still with reference to FIG. 2, at this point the operator takes from a system for feeding moulds 5 (not shown), which is provided in the working area W, a mould 5 of any type illustrated in FIG. 2, having a bottom 6 suitable for the size and shape of the histological sample.

In a further embodiment, the above described system for feeding moulds 5 to the working area W can be of the automatic type, i.e. controlled by the electronic controller E so as to select, on the basis of the detection of the volume of the histological sample S which occurs precisely in this step, by means of the aforementioned known measuring or scanning device (not shown), a mould 5 having a bottom 6 whose size is suitable for the histological sample S to be treated and to feed it directly to the working area W, relieving the operator from the task of having to choose it manually. In particular, the choice of a suitable mould 5 can be made easier by the reading, by such automatic system, of an information carrier F (see FIG. 9) associated with the mould, i.e. a code (for example, again, a bar code or QR code) identifying the size of the mould itself.

On the bottom 6 of the mould 5 is then deposited, by means of the dispensing device 14 (FIG. 5) arranged at the working area W, a first layer of embedding material (paraffin) which is dispensed at a temperature sufficient to keep it in a fluid state. Preferably, this first layer of embedding material is dispensed within the mould 5 in an automated way and in a repeatable quantity controlled by a level sensor of the embedding material, included in the dispensing device 14 (not shown in the figures), as well as calibrated according to the type of mould, i.e. the size of its bottom. In this way the dispensing is interrupted by the electronic controller E, once received by this level sensor a signal indicating the reaching of the correct predetermined level of such first layer of embedding material within the mould 5, and the controller E retains the information, for the specific mould, related to the volume of the first layer of embedding material dispensed. The level sensor can be an optical sensor of any known type, for example operating in reflection, able to measure the distance of the sensor from the free surface of the paraffin layer.

At this point, the operator places the histological sample on the bottom 6, orienting it in the most appropriate way. The orientation is chosen by the operator on the basis of the information provided to him via the monitor M by the electronic controller E relating to the nature of the sample, possibly with the help of macroscopic photographs of the sample, considering the operations to which the sample must be subjected. In particular, the orientation will be chosen in such a way that the cutting operation performed at the microtome downstream of the workstation allows to obtain sections of the sample that are optimal for following analyses.

As can be seen the orientation operation, in the workstation according to the invention, is left to the operator, as it is critical for obtaining the best results of subsequent laboratory analyses. At the same time, the total automation of the operations that precede and follow the manual positioning and orientation of the sample allows to drastically increase the productivity of the laboratory. As already indicated, to these advantages are added further advantages already discussed above, related to the traceability of the sample through the entire path in the workstation and to the possibility of obtaining an extremely precise dosing of the embedding material, so as to avoid trimming operations of the final solidified body of the embedding material containing the histological sample.

Figure 9:
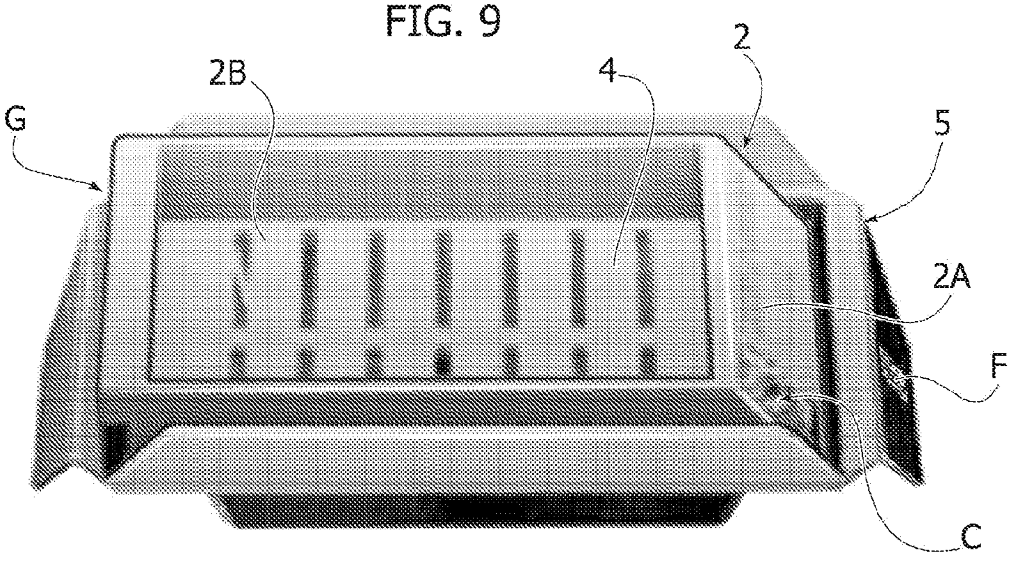

FIG. 9 of the annexed drawings shows the result of the operations performed by the operator in the working area W. At the end of this cycle of operations in the working area W there is a mould 5 on whose bottom 6 there is the first layer of embedding material dispensed by the dispensing device 14, in which the operator has then placed and oriented the histological sample. As can be seen in FIG. 9, the body of the cassette 2 is applied above the mould 5 as a lid. The mould 5 and the body of the cassette 2 therefore have dimensions suitable for this purpose. As also visible in FIG. 9, the body of the cassette 2 defines a cavity 2B intended to be filled with embedding material, whose bottom wall 4 has pass-through openings, as previously indicated, so as to allow the passage of the embedding material which is poured within the cavity 2B into the underlying mould 5. As can also be seen in FIG. 9, the inclined end surface 2A of the body of the cassette 2, bearing the code C, remains in a position exposed to view.

With reference again to FIG. 5 and FIG. 10, the drawings illustrate purely by way of example an embodiment of the transfer device 15, where such transfer device comprises a belt conveyor which moves along a closed loop path in a horizontal plane supports 15A, each configured and sized to receive above itself a group G (FIG. 9) defined by a mould 5 containing a histological sample and the associated body of the cassette 2 applied above it.

Figure 10:
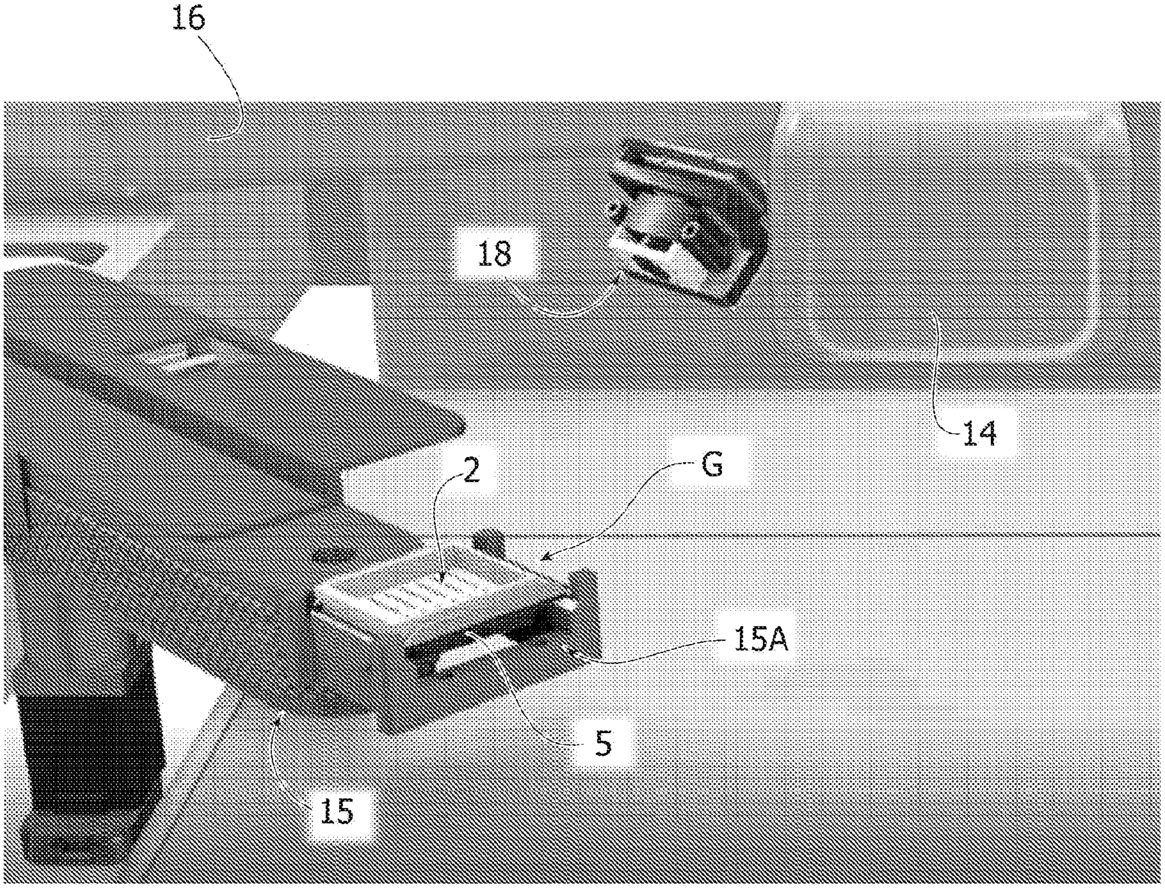
Figure 11:
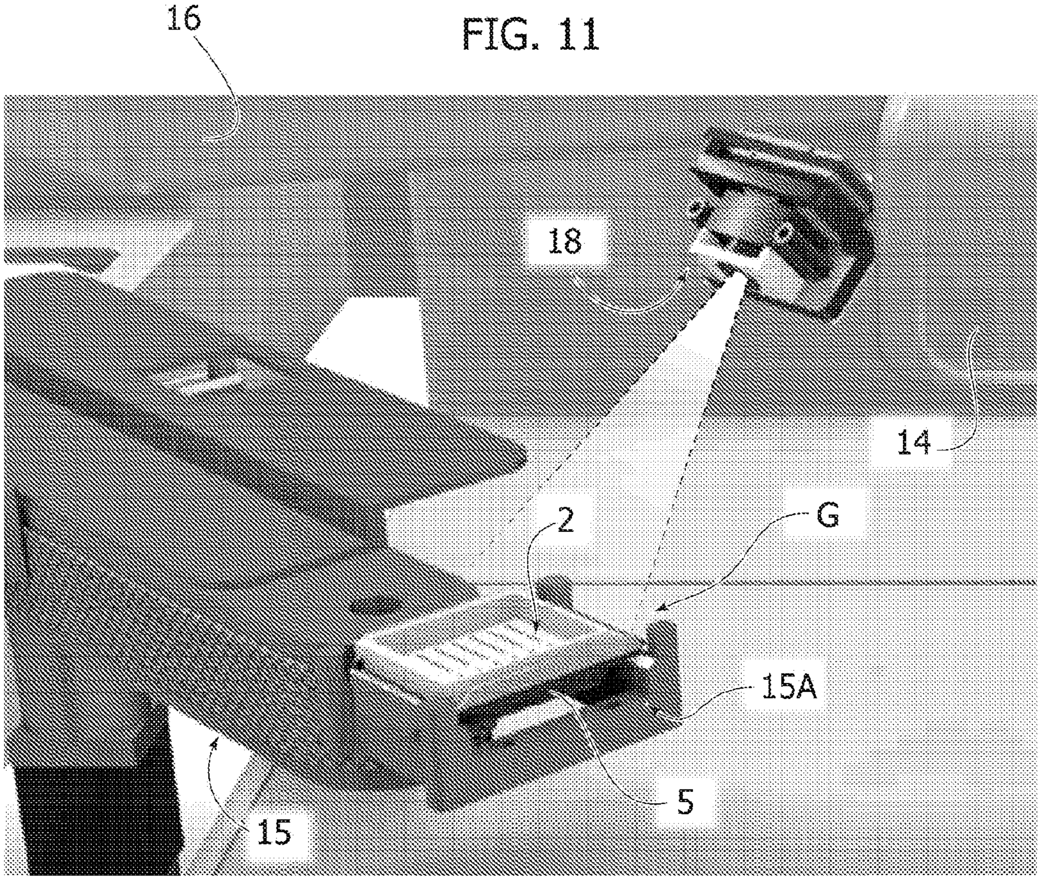
Figure 12:
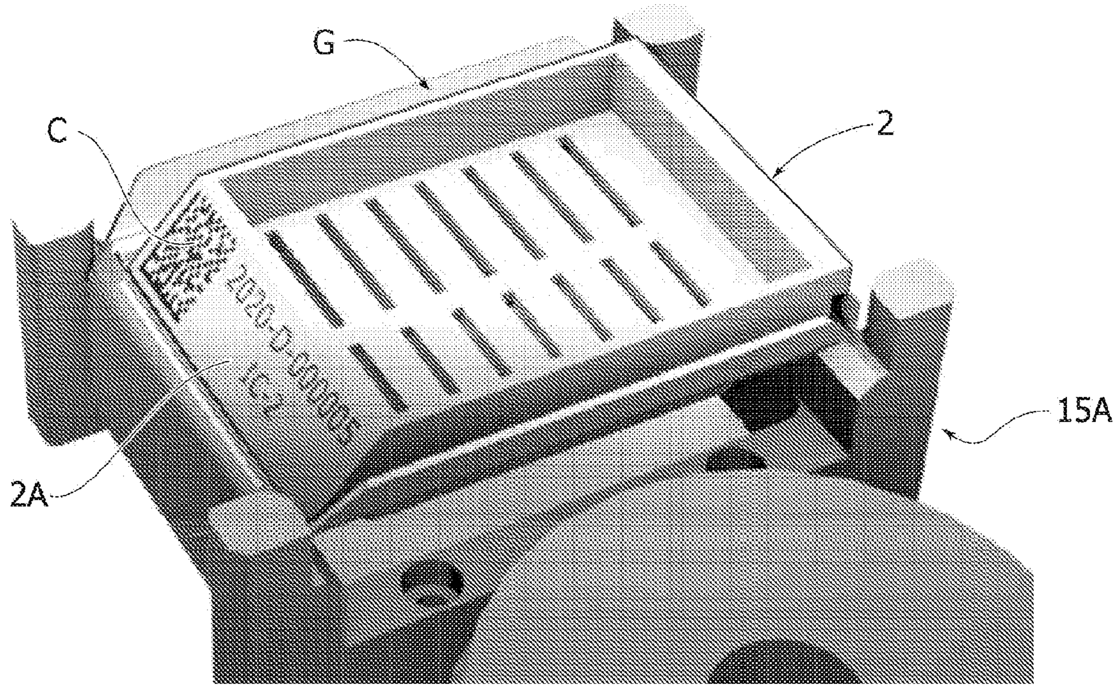
Figure 14:
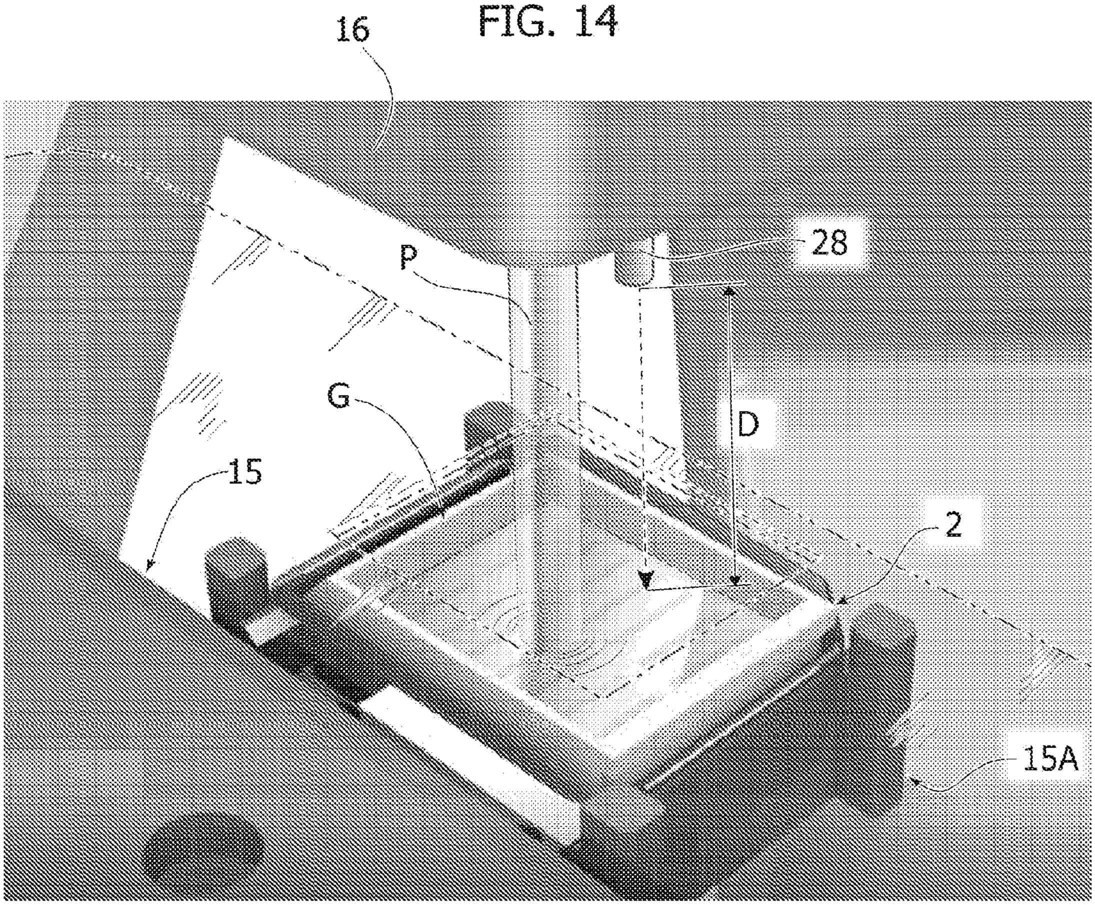
Figure 15:
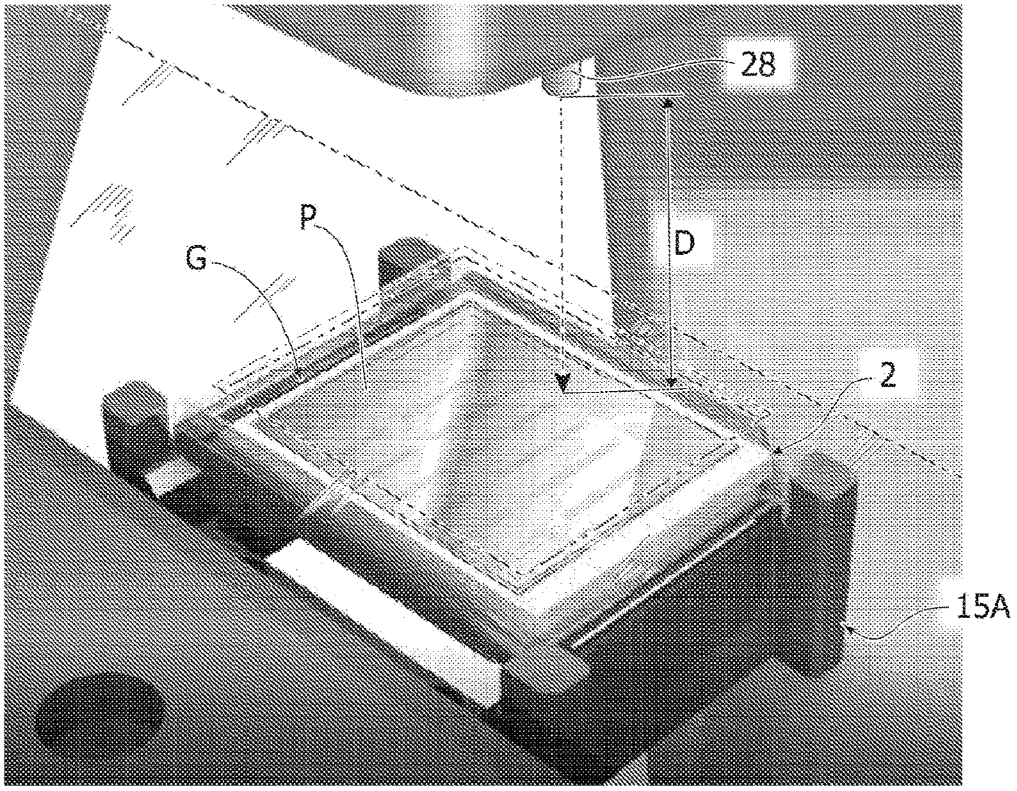

The transfer device 15 stops a support 15A in a position ready to receive a new group G (FIG. 5). FIG. 10 shows the step in which a group G has been positioned within the support 15A which is in the waiting position. At this point, the electronic controller E controls the movement of the transfer device 15, which at first moves the group G in front of the detection station 18 (FIG. 11) for the detection of the information contained in the code C (FIG. 12) and later below the station 16 for dispensing the embedding material (FIG. 14). The detection station 18 can comprise an optical detector of any known type.

Figure 13:
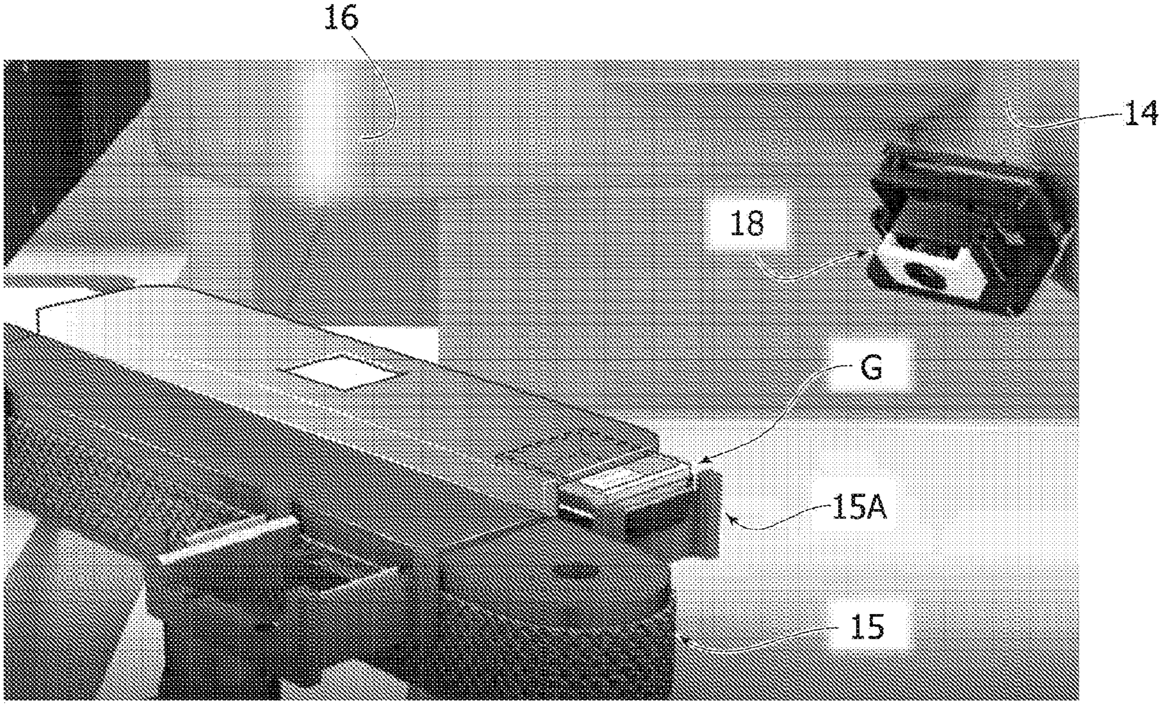

FIG. 13 shows a step in which a group G is in transfer towards the dispensing device 16, after being passed in front of the detection station 18.

In an example, the electronic controller E is programmed to enable the feeding to the working area W of a new cassette by the handling device 12, when it receives, from the detection station 18 downstream of the working area W, a signal which indicates the detection by the latter of the code C of the cassette, coming from the working area W, which is located in front of the detection station 18, and which acts as a signal of completion of the cycle of operations on the cassette itself in the working area W. Naturally, the enable signal to the feeding of a new cassette in the working area W could be obtained in any other way, or be activated by the operator itself, without prejudice to the principle of feeding the cassettes to the working area W one at a time.

FIG. 14 shows the step in which the body of the cassette 2, which is in position below the dispensing device 16, is stopped in this position to receive a flow of embedding material P, which is at a sufficient temperature to keep it in a fluid state. The dispensing device 16 is substantially constituted by a tap controlled by a solenoid valve which is controlled by the electronic controller E of the workstation on the basis of the feedback signal sent by a sensor 28 associated with the dispensing device 16. The sensor 28 is a sensor able to detect the level of embedding material P, and can be an optical sensor of any known type, for example operating in reflection, able to measure the distance of the sensor itself with respect to the free surface of the fluid of embedding material P poured into the cassette 2. The signal emitted by the sensor 28 can also be displayed on a monitor in the form of a numerical indication of the distance D between the sensor and the free surface of the embedding material P. During the dispensing step, the distance D progressively decreases until a predetermined value is reached, corresponding to the correct quantity of embedding material, which is predetermined according to the size of the cassette 2 and the mould 5 arranged below the cassette 2. The electronic controller E is therefore able to close the solenoid valve that controls the dispensing of the embedding material and consequently stop the dispensing of the material P when a correct quantity is reached, i.e. a predetermined level of the material P within the cassette 2. During this dispensing operation, the electronic controller E takes into account, by means of a specific algorithm, the information it previously had on the volume occupied by the histological sample S within the mould 5, as well as on the dimensions of the bottom 6 of the mould 5 itself and then on the volume of the first layer of embedding material dispensed by the dispensing device 14, in order to adequately calibrate the dispensing of the appropriate amount of embedding material P to reach the aforementioned predetermined level. As already illustrated above, thanks to the reaching of the correct quantity of embedding material P and to the automated handling, in the following processing step, when the embedding material P has solidified, the body obtained must not be trimmed, as it already has the correct size to be then received in a downstream microtome.

Basically, it is achieved a total control, till the last drop, of the volume of embedding material dispensed by both the dispensing devices 14 and 16, calibrating everything according to the volume of the histological sample S to be embedded and therefore to the dimensions of the bottom 6 of the mould 5 that receives it. Essentially, the accuracy in dispensing the correct amount of embedding material is ensured by the combination of two controls, one on the appropriate volume of embedding material to be dispensed, the other on the reaching of the predetermined level of embedding material, both within the mould 5 (for the first layer of embedding material) and within the associated cassette 2 (for the embedding material P).

Returning to FIG. 5, the reference number 20 indicates a handling device of any known type, for example similar to the handling device 12 associated with the input area A, for picking up each group G, consisting of a mould with the associated cassette now filled with embedding material, coming from the transfer device 15 and for positioning it in the cooling area B. Naturally, also the handling device 20 is controlled by the electronic controller E. Even in this case, therefore, the handling device 20 can comprise a gripping head 20A movable along a vertical axis Z on a slide 20B which slides on a beam 20C in a horizontal direction Y. The beam 20C protrudes from a slide 20D which is slidably mounted along a horizontal direction X on a beam 20E secured to the bench 9.

Figure 16:
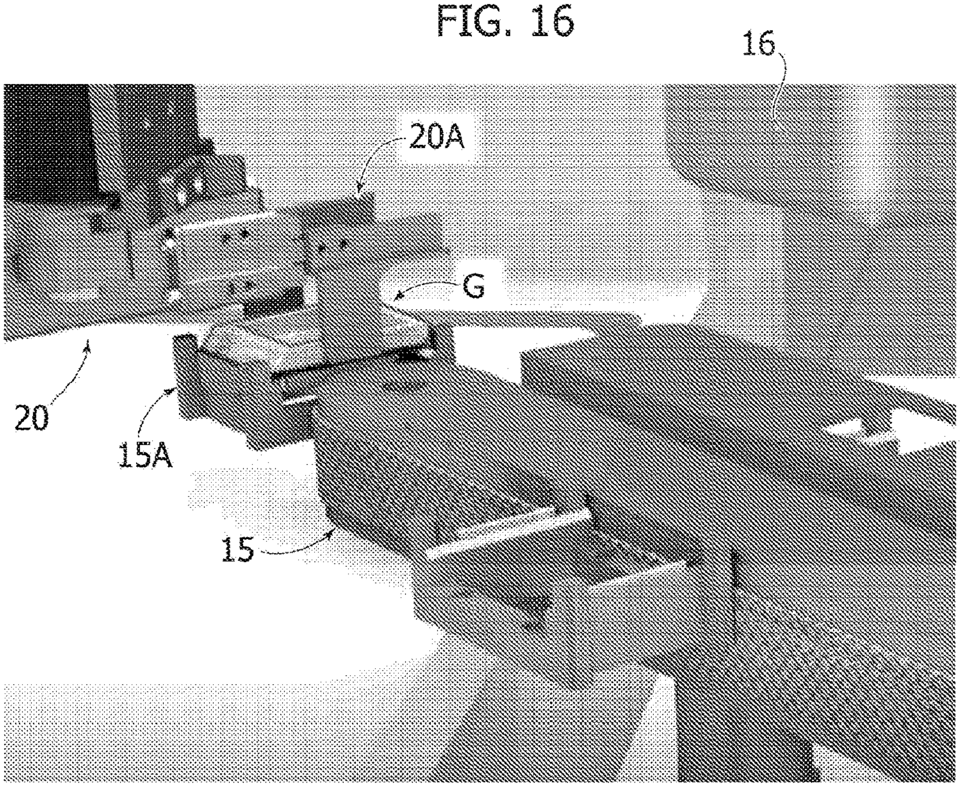

Naturally, both the configuration of the handling devices 12 and 20 and the configuration of the transfer device 15 could vary widely. As an alternative to the examples used, it is therefore possible to adopt handling and transfer devices of any other known type. FIG. 16 shows the step in which the transfer device 15 stops in a condition in which a group G, coming from the dispensing device of the embedding material, is in the waiting position, to be picked up by the gripping head 20A of the handling device 20.

Figure 17:
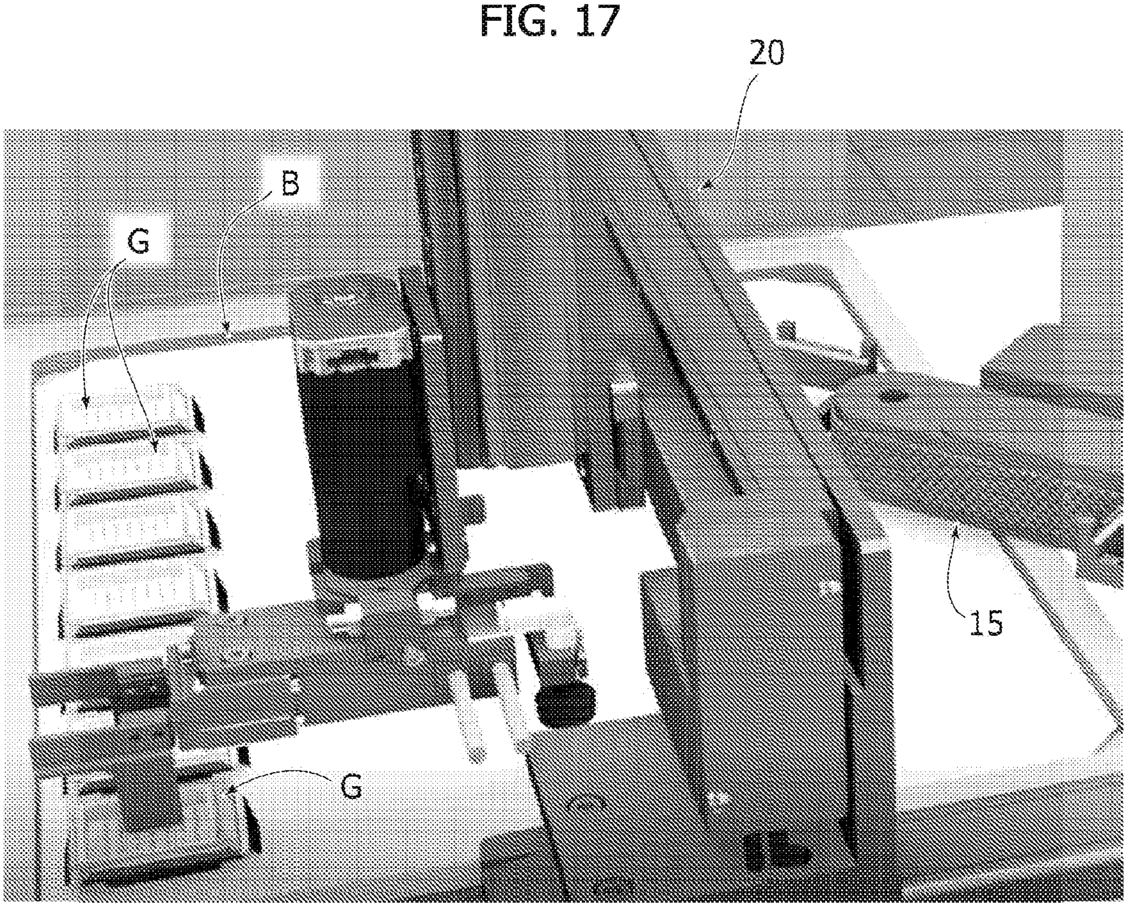

FIG. 17 shows the next step in which the handling device 20 places the picked up group G on a cooled metal plate, in the cooling area B.

Figure 18:
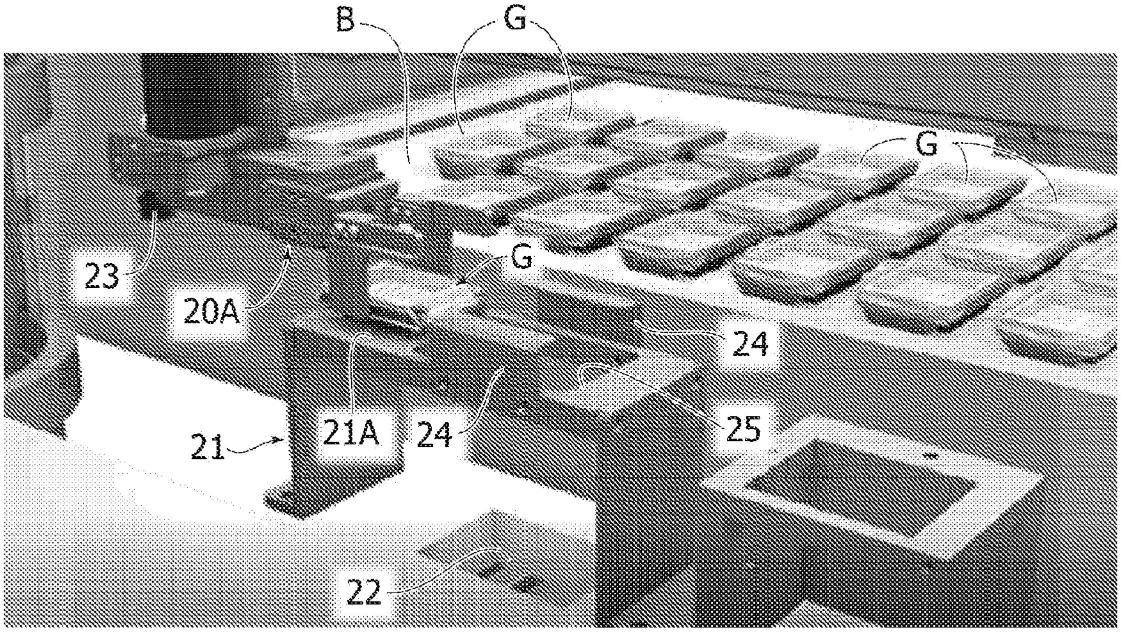

FIG. 18 shows the cooling area B with the groups G deposited therein, while the handling device 20 carries an already cooled group G to a station 21 where it is carried out the detachment of the mould 5 from the solidified body of embedding material P, containing the histological sample inside. It should be noted that, in an alternative embodiment not shown, the handling device could be a different handling device with respect to the handling device 20. It is in any case a handling device naturally controlled by the electronic controller E.

Figure 19:
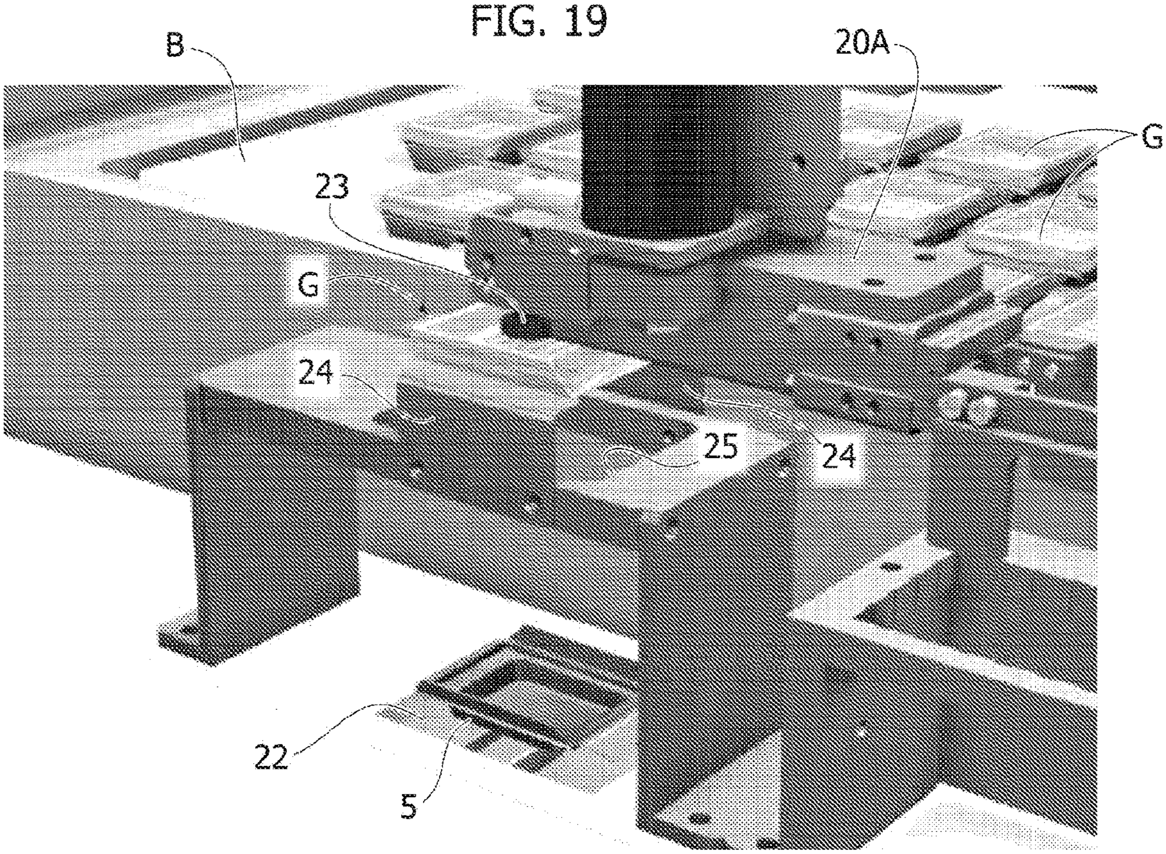
Figure 20:
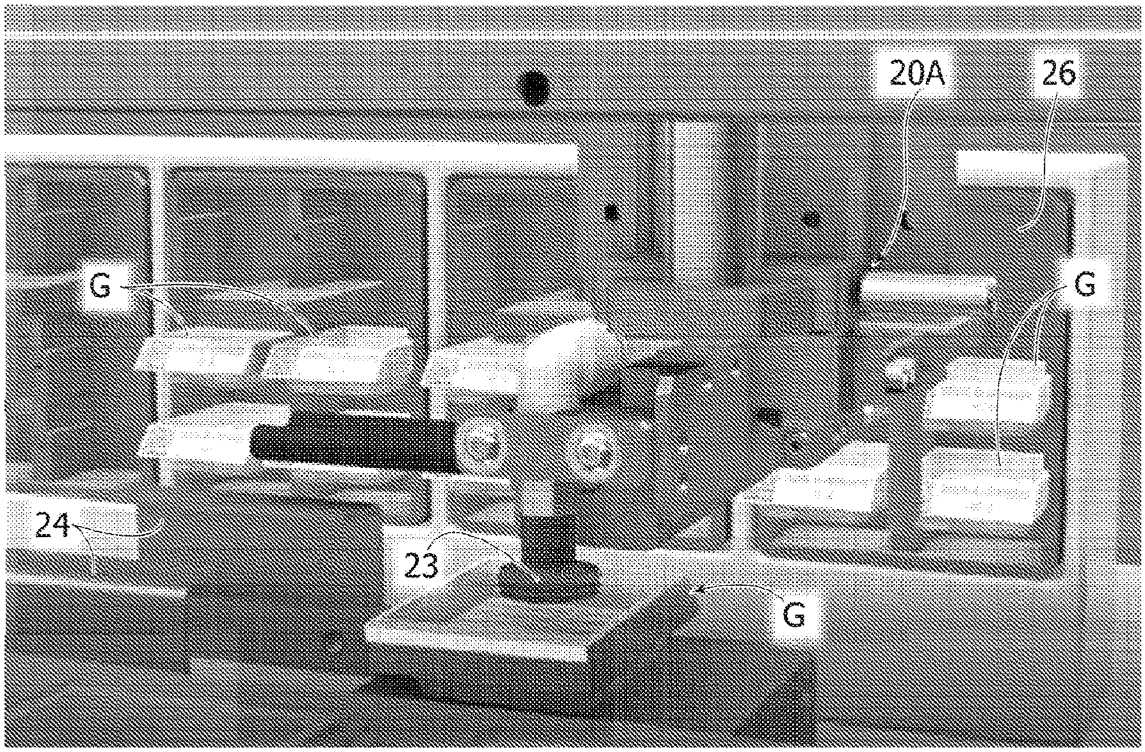
Figure 21:
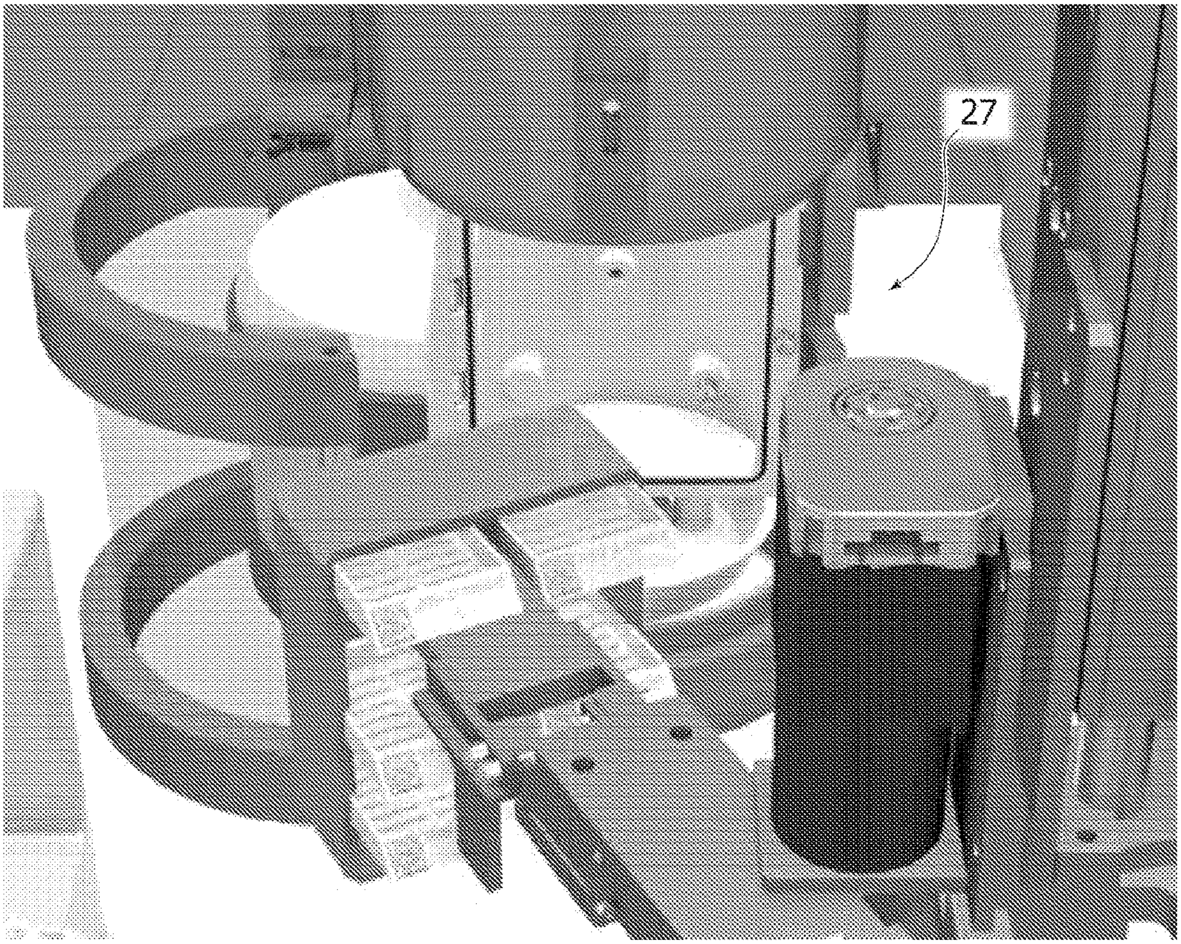

Following the aforementioned detachment, the mould 5 falls into a pit 22 where it is retrieved by an automatic transport system for retrieval of the moulds, while the solidified body of the embedding material remains adhered to the body of the respective cassette 2. In the illustrated example, the gripping head 20A of the handling device 20 temporarily places the group G on a horizontal support wall 21A, after which it releases the group G. The head 20A is rotated around a vertical axis to carry a gripping device 23, which always belongs to the head 20A, to engage the upper surface of the solidified body of embedding material P belonging to the group G. By means of the gripping device 23, the head 20A brings the group G above the pit 22, between two brackets 24 carried by the supporting wall 21A at the two sides of an opening 25 of the wall 21A. The two brackets 24 have upper edges folded horizontally. When the gripping device 23 has brought the group G above the opening 25 and between the two brackets 24, the detachment of the mould can already occur naturally by gravity, but if necessary the gripping device 23 moves slightly upwards the group G in such a way that the opposite edges of the mould 5 are held by the folded edges of the brackets 24, which causes the mould 5 to fall into the pit 22 passing through the opening 25, while the group G constituted by the solidified body 7 of embedding material P with the cassette 2 associated therewith remains joined to the gripping device 23 (FIG. 19). In this condition, the electronic controller E can control the handling device 20 to transfer the group G to an accumulation area 26 of the groups G (FIG. 20) or directly to an output area U of the workstation, connected to the inlet 27 of an automated transport system 11 downstream of the workstation. In the event of the stop in an accumulation area 26, the handling device 20 then provides from time to time to feed the groups G from the accumulation area 26 towards the output area U of the workstation, i.e. substantially towards the inlet 27 of the transport system 11. The cassettes can typically be grouped for homogeneity of subsequent destination. In any case, also in this step a selection ("sorting") operation can be performed, which can be correlated to the sorting operation performed upstream of the working area W and which can be identically assisted by an optical detection device 18" (FIG. 4) associated with the handling device 20 or arranged in a stationary position in the output area of the workstation and able to detect the code C carried by each cassette 2. In the example illustrated in FIG. 4 the optical detection device 18" is in a stationary position and is able to detect the code C of a cassette carried in front of it by the handling device 20.

The detached moulds 5 which are received in the pit 22 can be retrieved by an automatic transport system, unless they are of the disposable type. The automatic transport system can feed the moulds through a cleaning station, to remove the residues of the embedding material, and then convey them back to the feeding system of the moulds 5 to the working area W.

Naturally, the principle of the invention remaining the same, the details of construction and the embodiments may vary widely with respect to those described and illustrated purely by way of example, without thereby departing from the scope of the present invention, as defined in the attached claims. For example, it is not excluded that the orientation of the sample within the mould is also performed using an automated system.

The invention claimed is:

1. An automated workstation for an operator, for embedding histological samples with embedding material, the workstation comprising:

a workbench for the operator, defining a working area of the operator, an input area for the histological samples intended to undergo an embedding operation, placed on one side of the working area of the operator and configured to receive and accumulate in an automated way, from a transport system, cassettes containing the histological samples, wherein each cassette comprises a body bearing an information carrier with information associated with the histological sample which is contained within the cassette, a first detection device arranged within said input area and configured to detect the information of the information carrier of each of the cassettes located within the input area, a first handling device next to said input area and to said working area of the operator, and configured and programmed to pick up the cassettes containing the histological samples from said input area and to feed them, one at a time, to said working area, an electronic controller of said workstation, configured and programmed to:

receive from said first detection device, and store, the information associated with the histological sample of each of the cassettes located within the input area, control said first handling device, so as to feed, one at a time, the cassettes containing the histological samples from said input area to said working area, according to a priority sequence determined in real time as a function of the information associated with the histological samples of the cassettes, said electronic controller enabling the feeding of each new cassette from said input area to said working area of the operator only after receiving a signal which indicates that the working area of the operator is free to receive a new cassette, wherein said working area of the operator is provided with a plurality of embedding moulds, so as to provide for the operator to select each time a suitable mould, according to a size of the histological sample contained in each new cassette that reaches the working area of the operator, wherein a first embedding material dispensing device, which is configured to be used to dispense a first layer of embedding material within a selected mould, is associated with said working area, in such a way that, for each new cassette reaching the working area, the operator removes the histological sample from the cassette, detects the volume of the histological sample, consequently selects a mould, obtains the dispensing of a first layer of embedding material within the selected mould by means of said first dispensing device, places the histological sample, with a selected orientation, within the mould and over the first layer of embedding material, and then applies the cassette over the mould containing the histological sample, said workstation further comprising:

a transfer device arranged on one side of the working area, on the opposite side with respect to said input area, to transfer the cassettes out of the working area, said transfer device being configured to receive, one at a time, from the operator, the moulds containing the histological samples with the selected orientation, each mould with the respective cassette applied thereon, a second detection device associated with said transfer device and arranged and configured to detect the information carried by the information carrier of each cassette transported by said transfer device, and to send to said electronic controller a signal which indicates passage of each new cassette on the transfer device, such signal being indicative of the working area (W) of the operator being free to receive the new cassette from the input area, a second embedding material dispensing device associated with said transfer device, and configured to fill, in a controlled manner, each mould carried by said transfer device, and an associated cassette placed thereon, with a volume of embedding material, said second dispensing device being servo-controlled by said electronic controller on a basis of a signal of a sensor configured to detect a level of the embedding material within the mould and the associated cassette, in such a way that dispensing of said embedding material is interrupted when a predetermined level of embedding material within the mould and the associated cassette has been reached, and a cooling area arranged downstream of said transfer device, configured to receive and accumulate in an automated way the moulds coming from said transfer device, each one with the associated histological sample covered by the embedding material and the respective cassette applied on the mould, in such a way that in said cooling area the embedding material containing each histological sample forms a solidified body, in which the histological sample is embedded.

2. The workstation according to claim 1, further comprising a second handling device, configured to pick up from the transfer device each mould and the associated cassette, which are filled with embedding material, and to deposit them at said cooling area.

3. The workstation according to claim 2, further comprising a third handling device, constituted by said second handling device or by a further handling device, configured and programmed to pick up the cassette and the solidified body of embedding material adhering thereto, together with the associated mould, after they have been cooled at said cooling area, and to feed them at first to a station for detachment of each mould from the solidified body adhering to the cassette and thereafter to an output area of the workstation which is configured for delivering the cassettes, with the associated solidified bodies in which the histological samples are embedded, to a transport system.

4. The workstation according to claim 2, further comprising an automatic transport system for retrieval of the moulds after their detachment from the respective solidified body of embedding material and from the associated cassette, and for feeding the retrieved moulds, through a cleaning station, back to the working area.

5. The workstation according to claim 1, wherein said working area is equipped with a monitor for displaying the information contained in the information carrier of the cassette located at the working area to the operator.

6. The workstation according to claim 5, wherein said mould feeding system for feeding the moulds is controlled by said electronic controller in such a way as to select, on a basis of the information contained in the information carrier of the cassette located at the working area and after detection of the size of the histological sample which is within the cassette, a mould of a type suitable for the histological sample to be processed and to feed this mould to the working area.

7. The workstation according to claim 1, wherein the working area is provided with a mould feeding system, for feeding moulds to the working area.

8. The workstation according to claim 1, wherein the first embedding material dispensing device for dispensing the first layer of embedding material within the mould is servo-controlled by said electronic controller on the basis of the signal of the sensor configured to detect the level of the embedding material within the mould, in such a way that the dispensing of said embedding material is interrupted when the predetermined level of said first layer of embedding material within the mould has been reached.

9. A process for embedding histological samples within an embedding material, comprising the steps of:

preparing a workbench for an operator, the workbench defining a working area of the operator, receiving, and accumulating, in an automated way from a transport system, at an input area arranged on one side of the working area of the operator, cassettes containing histological samples intended to undergo an embedding operation, wherein each cassette comprises a body bearing an information carrier with information associated with the histological sample which is contained within the cassette, detecting, by means of a first detection device arranged within said input area, the information of the information carrier of each of the cassettes located within the input area, by means of an electronic controller of said workstation, receiving from said detection device, and storing, the information associated with the histological sample of each of the cassettes located within the input area, controlling, by means of said electronic controller, a first handling device so as to feed, one at a time, the cassettes containing the histological samples from said input area to said working area, according to a priority sequence determined in real time as a function of the information associated with the histological samples of the cassettes, the feeding of each cassette from said input area to said working area of the operator being enabled by the electronic controller only after receiving a signal which indicates that the working area of the operator is free to receive a new cassette, wherein said working area of the operator is provided with a plurality of embedding moulds, so as to provide for the operator to select each time a suitable mould, according to the size of the histological sample contained in each new cassette that reaches the working area of the operator, wherein a first embedding material dispensing device, which is configured to be used to dispense a first layer of embedding material within the selected mould, is associated with said working area, wherein, for each new cassette reaching the working area, the operator removes the histological sample from the cassette, detects a size of the histological sample, selects a mould, obtains the dispensing of the first layer of embedding material within the selected mould by means of said first dispensing device, places the histological sample, with a selected orientation, within the mould and over the first layer of embedding material, and then applies the cassette over the mould containing the histological sample, wherein the operator deposits, one at a time, the moulds containing the histological samples with the selected orientation, each mould with the respective cassette applied thereon, on a transfer device located on one side of the working area, on the opposite side with respect to said input area, which transfers the cassettes out of the working area, the process further comprising the steps of:

detecting, by means of a second detection device associated with said transfer device, the information carried by the information carrier of each cassette transported by said transfer device, and sending to said electronic controller a signal which indicates the passage of each new cassette on the transfer device, such signal being used as a signal which indicates that the working area of the operator is free to receive the new cassette from the input area, transporting each mould and associated cassette placed thereon, by means of said transfer device, to a second embedding material dispensing device, where the mould and the associated cassette are filled, in a controlled manner, with a volume of embedding material, said second dispensing device being servo-controlled by said electronic controller on a basis of a signal of a sensor configured to detect a level of the embedding material within the mould and the associated cassette, in such a way that the dispensing of said embedding material is interrupted when a predetermined level of embedding material within the mould and the associated cassette has been reached, and receiving and accumulating in an automated way in a cooling area, the moulds coming from said transfer device, each one with the respective histological sample covered by the embedding material and the associated cassette applied on the mould, in such a way that the embedding material containing each histological sample forms a solidified body in which the histological sample is embedded.

10. The process according to claim 9, further comprising the step of picking up, by means of a second handling device, each mould and the associated cassette from the transfer device, downstream of the second embedding material dispensing device, and depositing the mould with the associated cassette at said cooling area.

11. The process according to claim 10, further comprising the steps of:

picking up, after they have been cooled at said cooling area, and by means of a third handling device, constituted by the second handling device or by a further handling device, the cassette and the solidified body of embedding material adhering thereto, together with the associated mould, and feeding them at first to a station for detachment of each mould from the solidified body adhering to the cassette, and thereafter to an output area, and delivering, from said output area to a transport system, the cassettes with the associated solidified bodies in which the histological samples are embedded.

12. The process according to claim 10, wherein the moulds are retrieved, after their detachment from the respective solidified body of embedding material and from the associated cassette, by means of an automatic transport system which feeds the retrieved moulds, through a cleaning station, back to the working area.

13. The process according to claim 9, wherein at said working area an operator selects the orientation to be given to the histological sample placed within the mould on a basis of the information contained in the information carrier of the cassette located at the working area, which information is made available on a monitor with which the working area is equipped.

14. The process according to claim 9, further comprising providing a mould feeding system for feeding moulds to the working area, which mould feeding system is configured to select, on the basis of the information contained in the information carrier of the cassette located at the working area, and after detection of the size of the histological sample which is within the cassette, a mould of a type suitable for the histological sample to be processed and to feed this mould to the working area.

15. The process according to claim 9, further comprising calibrating the dispensing device for dispensing the first layer of embedding material within the mould which is being processed at the working area, on the basis of the size of the mould, and interrupting the dispensing upon reaching a predetermined level of said first layer of embedding material within the mould.

* * * * *